(12) United States Patent
    Wilson

(10) Patent No.: US 11,538,324 B2
(45) Date of Patent: Dec. 27, 2022

(54) SYSTEM AND METHOD FOR TRACKING AND MONITORING PERSONS SUBJECT TO RESTRICTED MOVEMENTS

(71) Applicant: PingGeo, Inc., Beaumont, TX (US)

(72) Inventor: Lee Wilson, Lumberton, TX (US)

(73) Assignee: Ping Geo Inc., Beaumont, TX (US)

( * ) Notice: Subject to any disclaimer, the term of this patent is extended or adjusted under 35 U.S.C. 154(b) by 0 days.

(21) Appl. No.: 16/947,985

(22) Filed: Aug. 26, 2020

(65) Prior Publication Data

US 2022/0068104 A1    Mar. 3, 2022

(51) Int. Cl.

| | | |
|---|---|---|
| G08B 23/00 | (2006.01) | |
| G08B 21/04 | (2006.01) | |
| G08B 25/10 | (2006.01) | |
| G08B 27/00 | (2006.01) | |
| H04L 67/02 | (2022.01) | |
| H04W 4/029 | (2018.01) | |
| H04W 4/14 | (2009.01) | |
| H04L 67/12 | (2022.01) | |
| H02J 7/00 | (2006.01) | |

(52) U.S. Cl.
    CPC ..... *G08B 21/0423* (2013.01); *G08B 21/0446* (2013.01); *G08B 25/10* (2013.01); *G08B 27/005* (2013.01); *H02J 7/0048* (2020.01); *H04L 67/02* (2013.01); *H04L 67/12* (2013.01); *H04W 4/029* (2018.02); *H04W 4/14* (2013.01)

(58) Field of Classification Search
    CPC ............... G08B 21/0423; G08B 25/10; G08B 21/0446; G08B 27/005; H02J 7/0048; H04W 4/14; H04W 4/029; H04L 67/12; H04L 67/02
    See application file for complete search history.

(56) References Cited

U.S. PATENT DOCUMENTS

| | | |
|---|---|---|
| 4,812,823 A | 3/1989 | Dickerson |
| 4,857,893 A | 8/1989 | Carroll |
| 5,146,207 A | 9/1992 | Henry et al. |
| (Continued) | | |

OTHER PUBLICATIONS

Application Report: Jonathan Valdez, Jared Becker, Texas Instruments—Understanding the I2C Bus-SLVA704, Jun. 2015.

*Primary Examiner* — Phung Nguyen
(74) *Attorney, Agent, or Firm* — H. Artoush Ohanian

(57) ABSTRACT

A tracking and monitoring system and method includes a callback engine in communication with a plurality of GNSS-enabled ankle monitor bracelets via cellular/Wi-Fi internet service or SMS text service, depending on availability of services at each bracelet location. SMS text communication may be routed via a relay service. Bracelet straps form electrical circuits by which open, closed, cut, or shorted conditions are detected and relayed to the callback engine. Bracelets include components for detection of magnetic hacking, physical intrusion, software hacking, and GNSS spoofing. The callback engine may remotely update bracelet setting and cause playback of audio messages; bracelets confirm execution with the callback engine. Bracelets include advanced power saving circuitry and notify the callback engine of low battery levels. An administration application allows efficient management of bracelets by law enforcement authorities and may communicate with bracelet wearers via the callback engine or a mobile phone application.

24 Claims, 16 Drawing Sheets

(56) References Cited

U.S. PATENT DOCUMENTS

| | | | |
|---|---|---|---|
| 5,189,395 A | 2/1993 | Mitchell | |
| 5,255,306 A | 10/1993 | Melton et al. | |
| 5,298,884 A * | 3/1994 | Gilmore | G08B 21/22 340/10.41 |
| 5,369,699 A | 11/1994 | Page et al. | |
| 5,461,390 A * | 10/1995 | Hoshen | G07C 9/28 342/419 |
| 5,661,458 A | 8/1997 | Page et al. | |
| 5,870,029 A * | 2/1999 | Otto | G08B 21/22 340/8.1 |
| 6,181,253 B1 * | 1/2001 | Eschenbach | G08B 21/0261 340/10.1 |
| 6,844,816 B1 | 1/2005 | Melton et al. | |
| D578,918 S | 10/2008 | Aninye | |
| 7,518,500 B2 | 4/2009 | Aninye et al. | |
| 7,864,047 B2 | 1/2011 | Aninye et al. | |
| 7,930,927 B2 | 4/2011 | Cooper et al. | |
| 8,489,113 B2 | 7/2013 | Walter et al. | |
| 8,493,219 B2 | 7/2013 | Buck et al. | |
| 8,547,222 B2 | 10/2013 | Aninye et al. | |
| 8,576,065 B2 | 11/2013 | Buck et al. | |
| 8,629,776 B2 | 1/2014 | Buck et al. | |
| 8,657,744 B2 | 2/2014 | Rompa et al. | |
| 8,831,627 B2 | 9/2014 | Aninye et al. | |
| 9,215,578 B2 | 12/2015 | Graff-Radford | |
| 9,240,118 B2 | 1/2016 | Melton | |
| 9,241,659 B2 | 1/2016 | Rompa et al. | |
| 9,355,548 B2 | 5/2016 | Buck et al. | |
| 9,355,579 B2 | 5/2016 | Buck et al. | |
| 9,373,241 B2 | 6/2016 | Aninye et al. | |
| 9,417,232 B2 | 8/2016 | Keays et al. | |
| 9,423,487 B2 | 8/2016 | Buck et al. | |
| 9,480,431 B2 | 11/2016 | Melton | |
| 9,521,513 B2 * | 12/2016 | McConathy | G06Q 50/265 |
| 9,569,952 B2 | 2/2017 | Buck et al. | |
| 9,626,855 B2 | 4/2017 | Melton | |
| 9,629,420 B2 | 4/2017 | Cooper et al. | |
| 9,668,095 B1 | 5/2017 | Newell et al. | |
| 9,746,456 B2 | 8/2017 | Keays | |
| 9,848,293 B2 | 12/2017 | Murray et al. | |
| 9,989,649 B2 | 6/2018 | Buck et al. | |
| 10,068,462 B2 | 9/2018 | Buck | |
| 10,074,261 B2 | 9/2018 | Findlay et al. | |
| 10,074,262 B2 | 9/2018 | Findlay et al. | |
| 10,097,952 B2 | 10/2018 | Buck et al. | |
| 10,101,431 B2 | 10/2018 | Buck et al. | |
| 10,194,267 B1 | 1/2019 | Newell et al. | |
| 10,198,930 B2 | 2/2019 | Melton et al. | |
| 10,467,883 B2 | 11/2019 | Buck et al. | |
| 2008/0012760 A1 * | 1/2008 | Derrick | G08B 21/0283 342/357.74 |
| 2008/0088437 A1 * | 4/2008 | Aninye | H04L 67/18 340/539.13 |
| 2013/0285855 A1 * | 10/2013 | Dupray | G01S 5/0278 342/451 |
| 2020/0154232 A1 * | 5/2020 | Segal | H04W 4/20 |

* cited by examiner

SYSTEM AND METHOD FOR TRACKING AND MONITORING PERSONS SUBJECT TO RESTRICTED MOVEMENTS

BACKGROUND

Electronic devices to monitor or track persons that are subject to restricted movements, such as judicially convicted persons on probation or parole or those released on bail prior to trial, have been around since the 1980s. Offender tracking systems typically employ tamper-resistant ankle monitor bracelets tethered at all times about the ankles of persons sentenced to house arrest or community control. An ankle monitor bracelet uses radio frequency signals to communicate with a monitoring station. It may be programmed to allow the subject to roam freely within a certain area, and it may have GPS monitoring functions to track the device wearer's location and alert the monitoring station if the subject departs the permitted area. If the device is tampered with or removed, it alerts authorities via the monitoring station.

Offender tracking systems are useful to support offenders' reintegration into society, allowing them to hold jobs and maintain a semblance of ordinary civilian life. Some convicts may serve their sentence in house arrest wearing an ankle bracelet, and some prisoners may be enrolled in work release programs to go to work during the day. Offender tracking systems may also serve to spare an accused suspect investigative jail time and may be employed by bail bondsmen. Accordingly, such systems may allow for a reduction of overcrowding in prisons and jails and concomitant taxpayer expense. For these reasons, it comes as no surprise that use of electronic monitoring devices is on the rise. According to a Pew study, the number of active, offender monitoring devices increased 140 percent from 2005 to 2015.

Electronic monitoring has the potential to keep offenders out of prison safely, but despite the increased use of offender tracking systems, current systems are hampered with shortcomings. Unfortunately, with the proliferation of electronic devices comes increased reports of their failing. False alerts may overwhelm corrections officials, and tamper-proof devices can be too easily circumvented.

For example, in 2011, officials in the state of California conducted tests on the monitoring devices worn by 4,000 high-risk gang members and sex offenders. According to the Los Angeles Times, the study found that "batteries died early, cases cracked, tampering alerts failed, and reported locations were off by as much as three miles." Devices were able to be thwarted by covering them in tin foil or going indoors. Authorities, inundated with as many as a thousand meaningless alerts per day, worried that they were missing actual instances of fleeing parolees.

Similarly, an audit in Tennessee found that eighty percent of alerts from offender monitoring devices were not checked by officers. In Colorado and New York, when officers missed or ignored repeated alerts of device failure, several parolees committed violent crimes. Officers in Florida were so overwhelmed with alerts that they stopped all real-time notifications, save those relating to device removal; as a result, it went unnoticed when one parolee broke his curfew fifty-three times in one month before killing three people.

Electronic monitoring may present unintended difficulties for the wearers of the devices as well. If a technical glitch causes a false alert, a wearer may be put back in jail for violating the terms of his or her release. Technical glitches can also hamper successful employment In 2011, the National Institute of Justice conducted a study of 5,000 offenders under electronic monitoring and found that many participants had to take breaks from work to walk around outside and reconnect lost signals. Twenty-two percent reported that they were fired or asked to leave a job because of the ankle monitors. The costs of electronic monitoring may pose a financial hurdle for those monitored as well, as many states either allow or require the cost of monitoring to be passed along to the wearers.

It is desirable, therefore, to provide a system and method for monitoring persons subject to restricted movements that addresses and overcomes the above-mentioned shortcomings.

BRIEF DESCRIPTION OF THE DRAWINGS

Many aspects of the present disclosure can be better understood with reference to the following drawings, in which.

The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
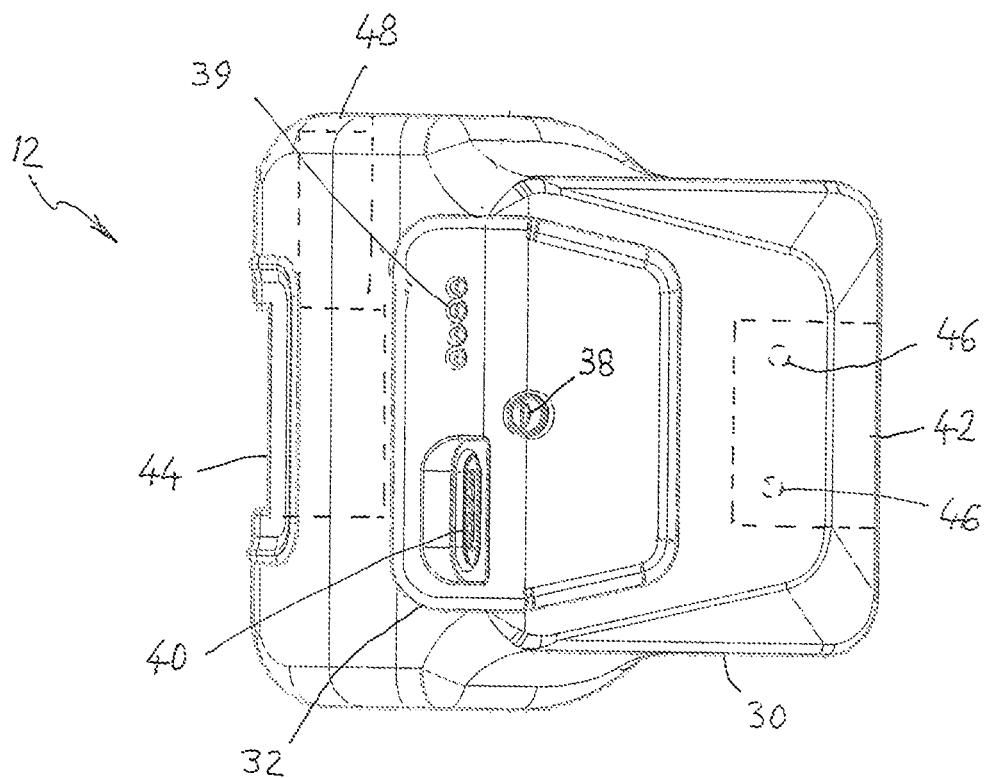
FIG. 1 is an elevation view of the front of an electronic monitoring device forming a part of an ankle monitor bracelet according to one or more embodiments.
Figure 2:
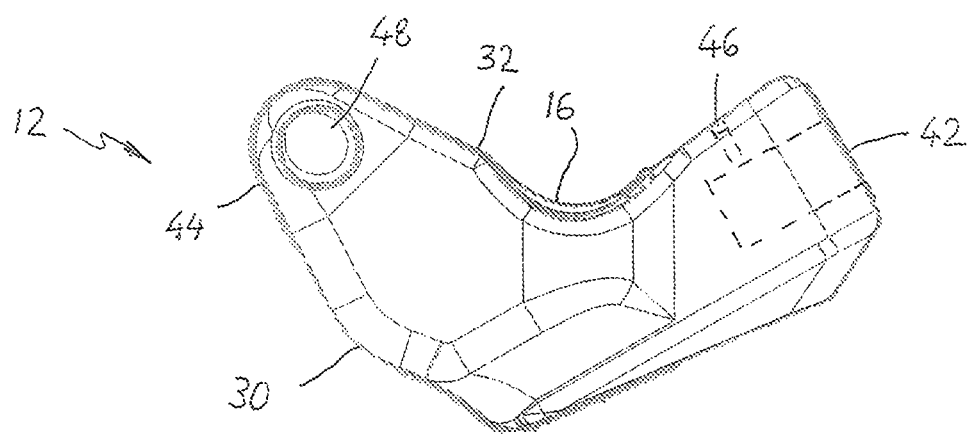
FIG. 2 is a plan view of the monitoring device of FIG. 1.

FIGS. 1 and 2 are an elevation view of the front and a plan view of the top, respectively, of an electronic monitoring device 12 that forms the intelligent part of an ankle monitor bracelet according to one or more embodiments. Referring to FIGS. 1 and 2, monitoring device 12 preferably includes a rugged case 30 housing a microcontroller having operatively coupled to a battery, a mobile communications module, a global navigation satellite system (GNSS) module with integrated antenna, a 3-axis accelerometer, a power management intelligent controller, a battery protection module, a sound processor, a speaker, a magnetic bridge, and various security devices, as described in greater detail hereinafter. These components may be mounted on one or more printed circuit boards (PCB s) as well understood in the art.

As electronic monitoring device 12 is intended to be worn full time by a person, case 30 is preferably made of rugged light-weight material, such as anodized aluminum or engineered polymers. Case 30 may be formed using a combination of materials, as known by routineers in the art. Case 30 is ideally water-resistant, thereby allowing bathing or showering by the wearer without adverse effects to the operation of monitoring device 12. Gaskets and seals are provided as necessary. The back side 16 of monitoring device 12, which is intended to abut the front shin of a wearer, is ideally concave along a vertical axis to provide a more comfortable fit. Back side 16 may include a resilient cushioning material, such as an elastomer, foam, or gel, adhered thereto to prevent chaffing of the wearer's skin.

Case 30 may include a removable cover 32 for controlled access to the interior components of monitoring device 12. Cover 32 is ideally located on back side 16 of case 30 (as more clearly seen in FIG. 8) to prevent its removal while the device is worn. Cover 32 may be securely affixed to case 30 by a tamper-resistant or anti-vandal screw 34. A speaker aperture 38 for providing audible signals to the wearer is provided. One or more light emitting diodes (LEDs) or other visual display 39 may be provided in case 30 for providing various status notifications to the wearer or to a technician performing maintenance of the device. A power port 40, which may be configured as a USB port due to the proliferation of USB chargers, may be provided to allow a wearer to recharge the battery of monitoring device 12.

Monitoring device 12 defines at a first side a receptacle 42 for receiving and holding fast therein a fixed end of a strap and on the obverse side a socket 44 for receiving and pivotally locking therein a pivotable end of the strap. As described in much greater detail, infra, each end of the strap may be affixed to monitoring device 12 by machine screws; screw plugs 46, 48 may cover access to the heads of the screws. Screw plugs 46, 48 may be continuously monitored by the microcontroller to detect removal, as described in greater detail below.

Figure 3:
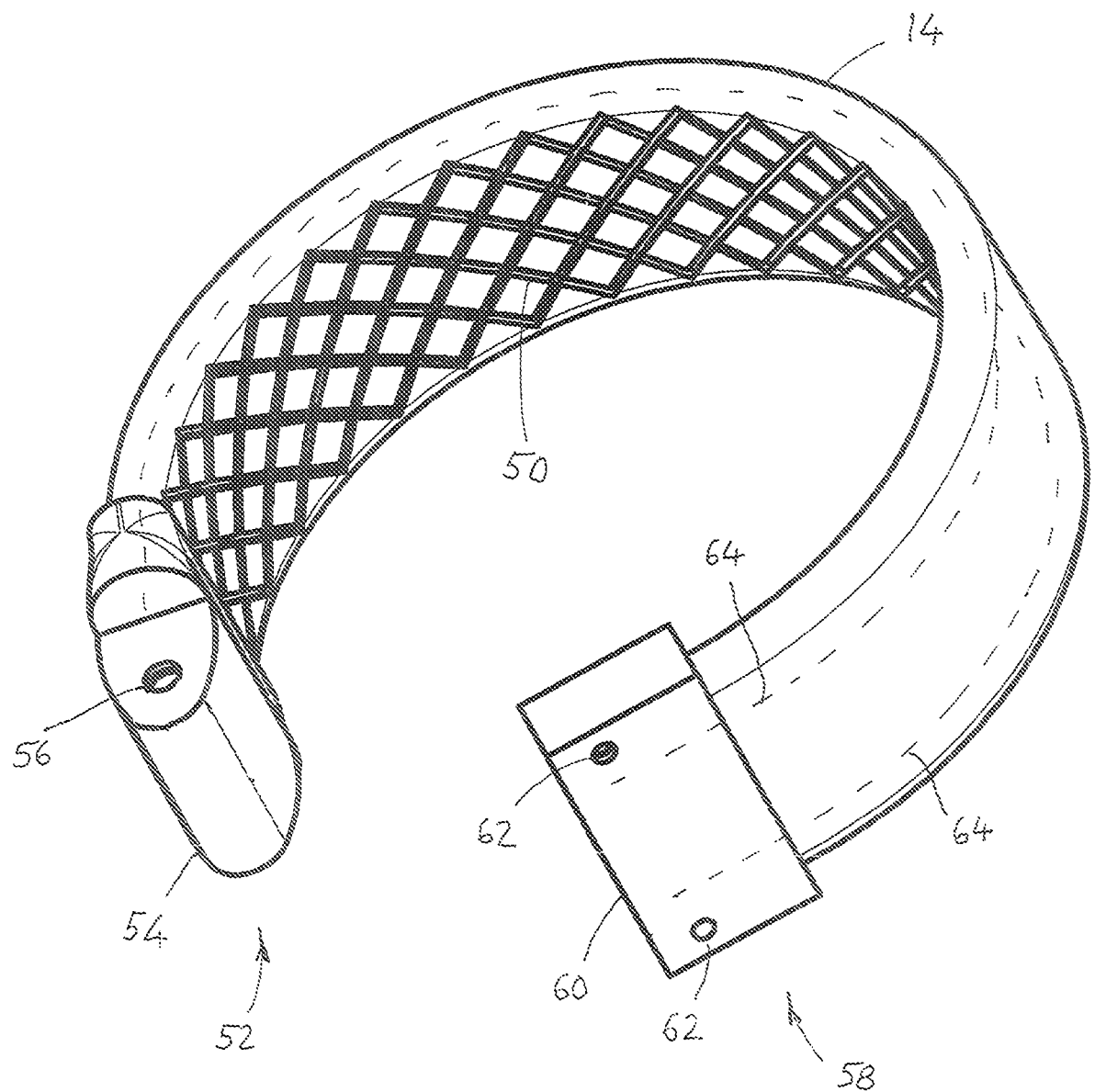
FIG. 3 is a perspective view of a strap forming a part of an ankle monitor bracelet according to one or more embodiments.

FIG. 3 is a perspective view of a strap 14 forming a part of an ankle monitor bracelet according to one or more embodiments. Strap 14 is designed and arranged to be wrapped around a wearer's ankle and secured at each end to electronic monitoring device 12. Referring now to FIG. 3, strap 14 is made of a flexible waterproof material that is characterized by a limited ability to be stretched and therefore removed from the wearer's ankle. In one or more embodiments, strap 14 is made of a silicone material. However, various polymers may also be used. To promote wearer comfort, the inner surface 50 of strap 14 may have ribbing or stippling 50 formed thereon to minimize surface contact with the skin, thereby promoting air circulation and breathability.

Strap 14 ideally has at least one end that rotates or pivots a limited amount with respect to monitoring device 12 when secured thereto to allow for some movement and comfort when worn. This end is referred to as pivoting end 52 and has attached thereto an eye fitting 54. Eye fitting 54 has a bolt hole 56 vertically formed therethrough by which it may be pivotally fastened within socket 44 of monitoring device 12. In one or more embodiments, strap 14 has a fixed end 58 with a plug 60 for being mounted within receptacle 42 of monitoring device 12. Plug 60 preferably includes one or more holes 62 through which machine screws may be used to fix plug 60 to monitoring device 12.

Various members may be longitudinally embedded within strap 14 during manufacture, when molded or extruded for example. For instance, optical fibers or wires having predefined electrical properties may be provided for security monitoring, and hardened steel wire rope or spring steel members may be provided to hamper cutting of strap 14. Alternatively or additionally, the material compound may be doped with various additives to provide particular electrical characteristics, such as impedance, resistivity, capacitance, et cetera. These properties may be continuously measured by monitoring device 12 to assess whether strap 14 has been severed or disconnected from monitoring device 12, as described below. FIG. 3 illustrates, by hidden line, two discrete electrically conductive wires 64 longitudinally embedded within strap 14.

Figure 4:
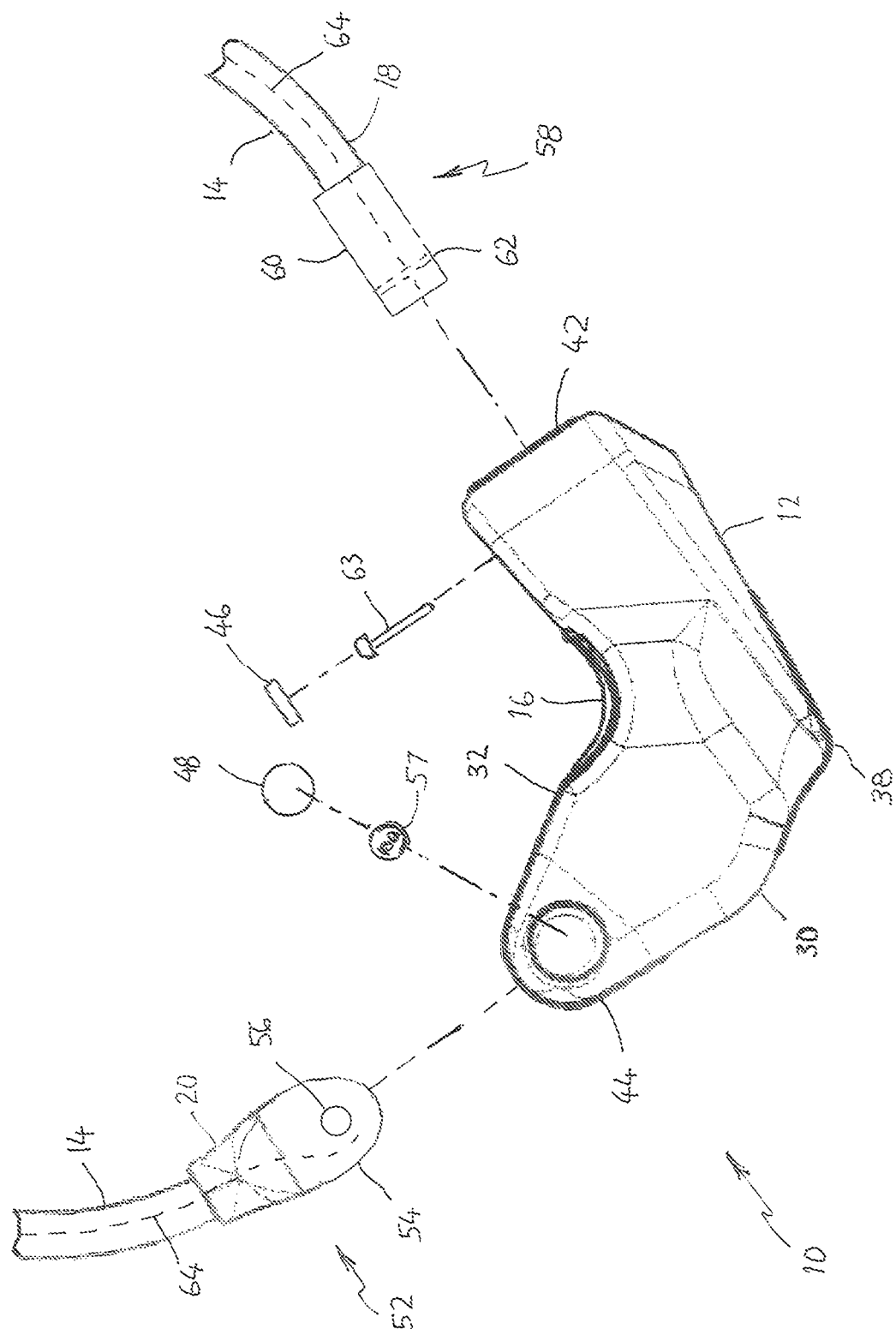
FIG. 4 is an exploded plan view of the top of an ankle monitor bracelet according to one or more embodiments, showing the monitoring device of FIGS. 1 and 2 and the strap of FIG. 3 for connection thereto.
Figure 5:
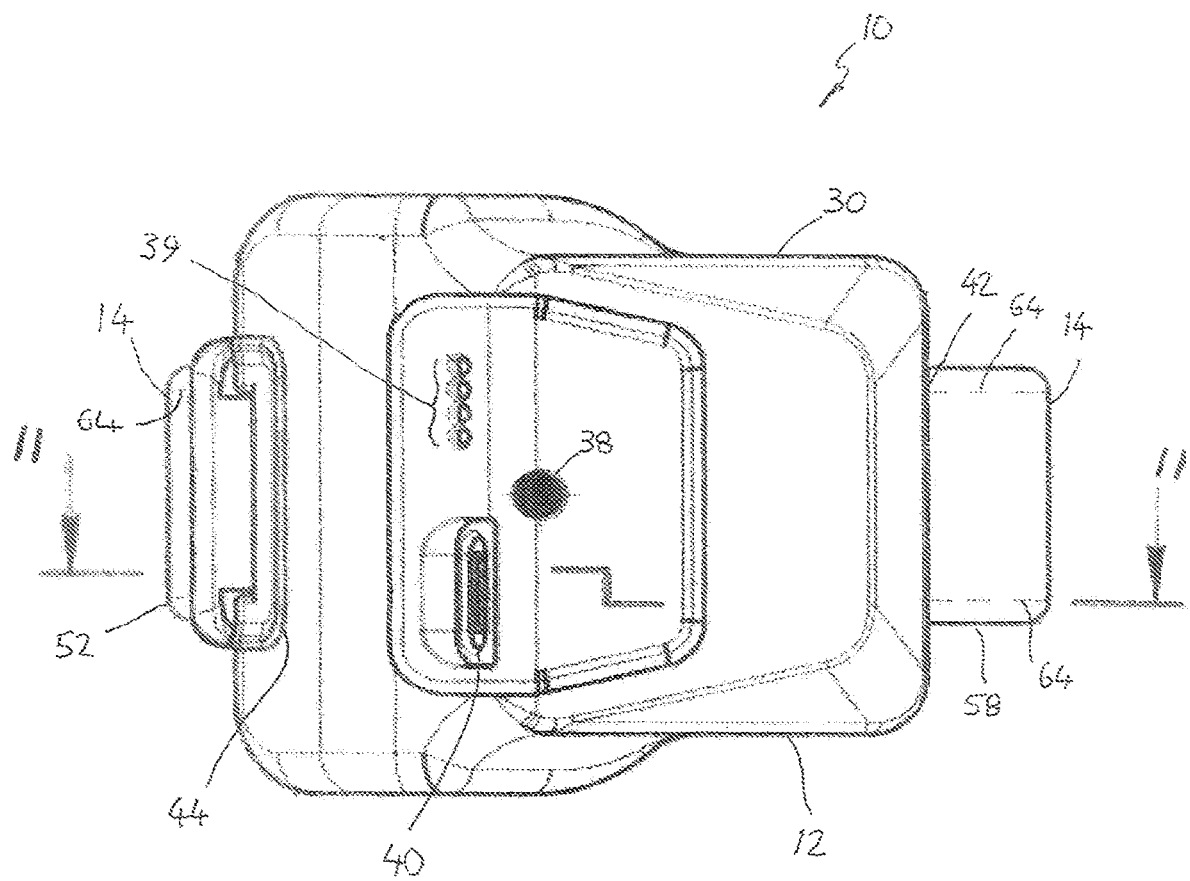
FIG. 5 is a an elevation view of the front of the ankle monitor bracelet of FIG. 4, showing the monitoring device connected to the strap in ankle monitor bracelet's closed, normal state.
Figure 6:
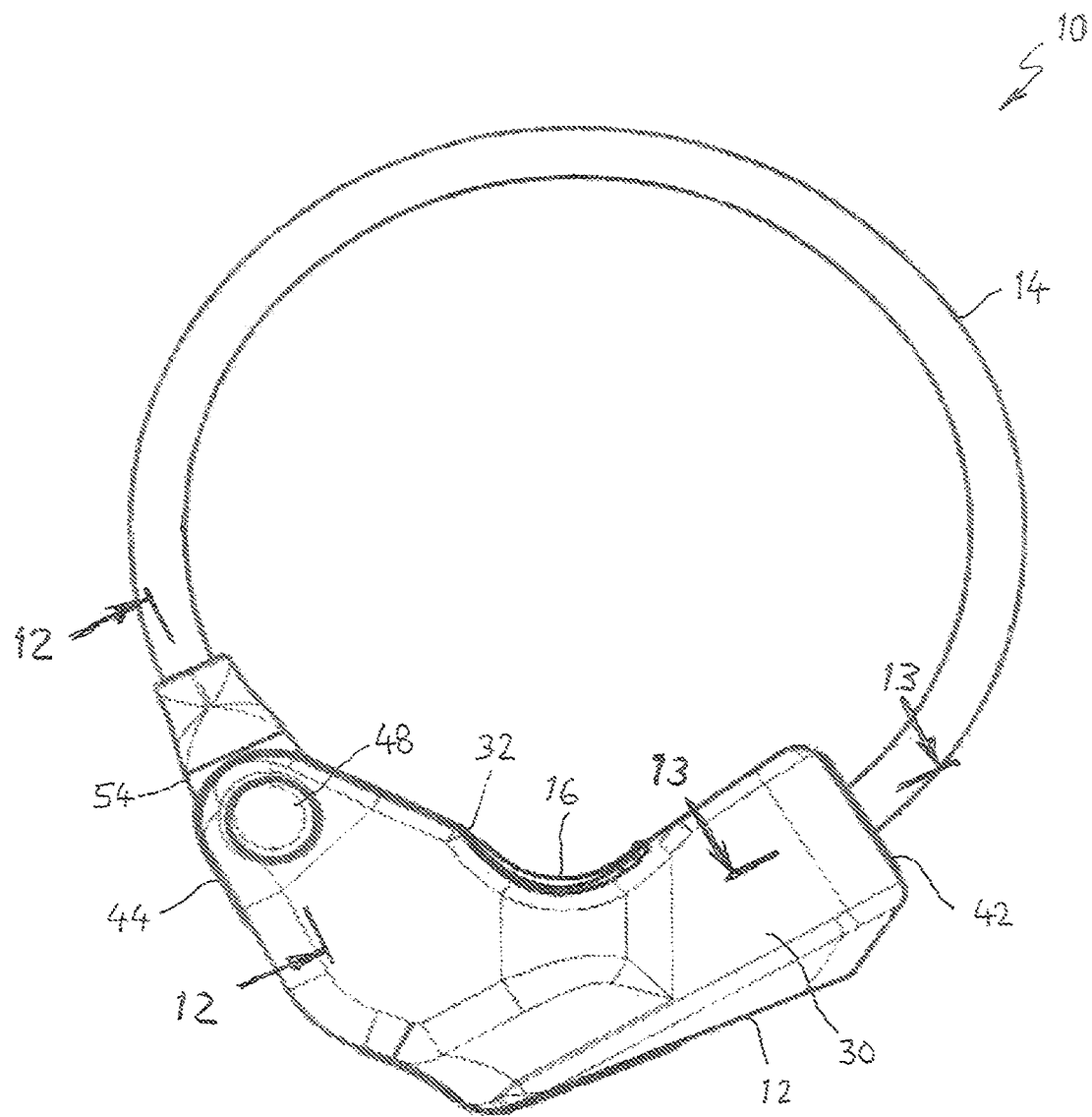
FIG. 6 is a plan view of an ankle monitor bracelet of FIG. 5.
Figure 7:
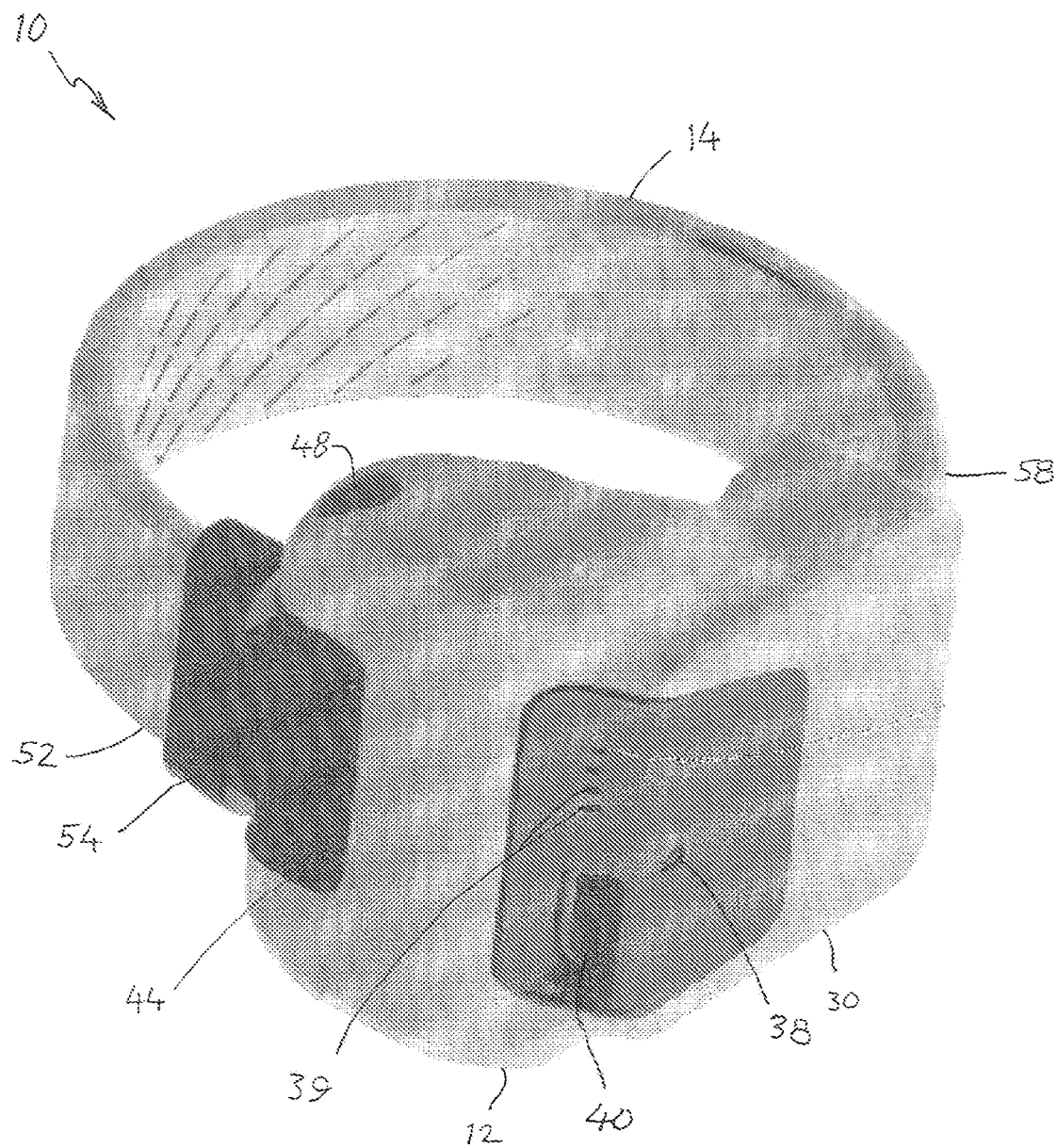
FIG. 7 is a perspective drawing showing the upper front view of the ankle monitor bracelet of FIG. 5.
Figure 8:
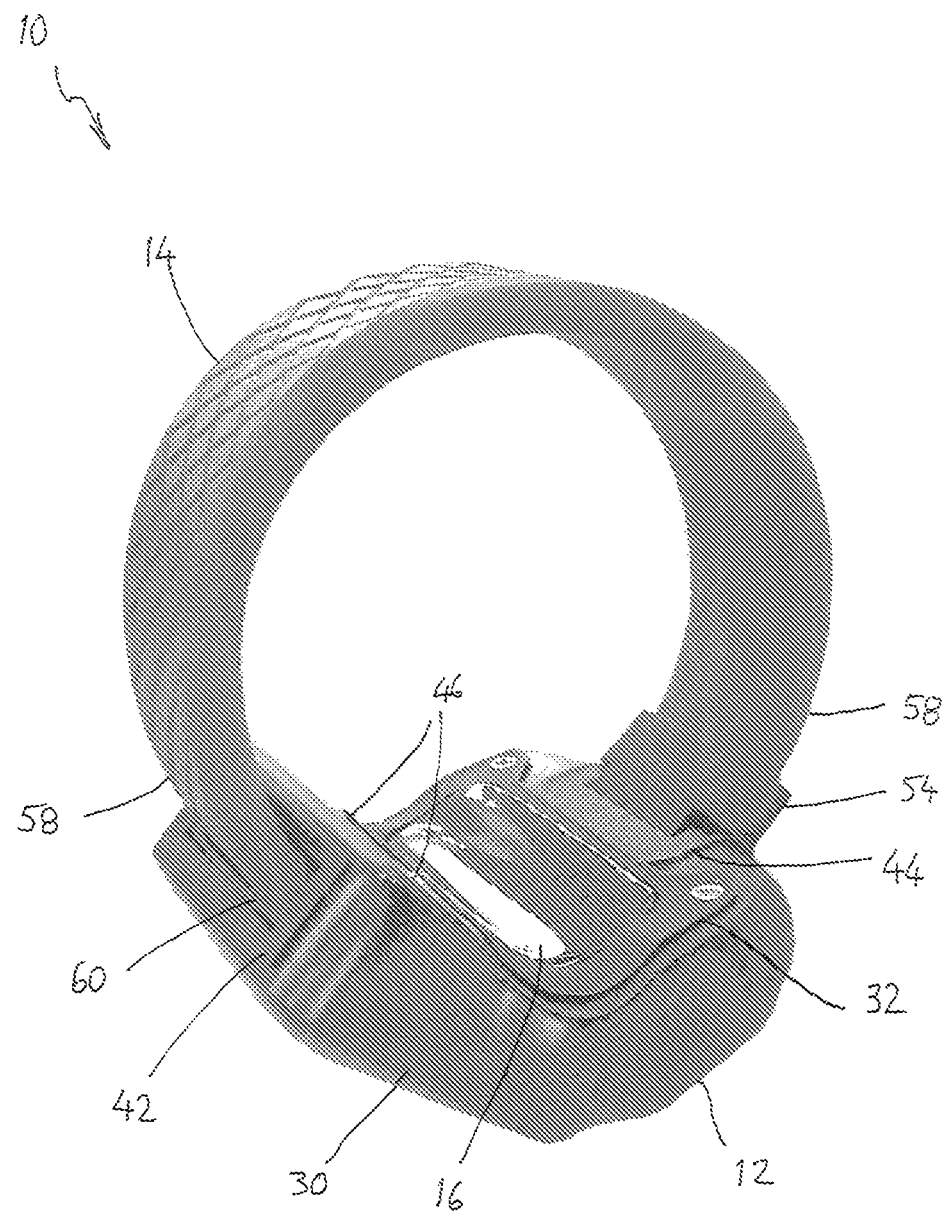
FIG. 8 is a perspective drawing showing the lower back view of the ankle monitor bracelet of FIG. 5.

FIG. 4 is an exploded plan view and FIGS. 5 and 6 are an elevation view of the front and a plan view of the top of an ankle monitor bracelet 10, respectively, according to one or more embodiments. FIGS. 7 and 8 are perspective view of the upper front and lower rear of ankle monitor bracelet 10. Referring to FIGS. 4-8, ankle monitor bracelet 10 includes monitoring device 12 and flexible strap 14, described previously. Ankle monitor bracelet 10 is illustrated in its closed, operating position, it which it would be snugly secured about the ankle of a person being monitored, with the concave back side 16 of monitoring device 12 adjacent to and abutting the shin of the wearer. Monitoring device 12 continuously monitors the status of the connection of strap 14 to monitoring device 12 and can determine whether strap 14 is properly connected, disconnected, broken or cut, or short circuited, such as by attempted hacking of ankle monitor bracelet 10, as described below.

As shown in FIG. 4, at the pivoting end 52 of strap 14, eye fitting 54 is pivotally mounted within socket 44 by a machine screw 57, which passes through aperture 56 and threads into a nut 59 (FIG. 12) that is rotationally held fixed within case 30. The head of machine screw 57 ideally has a tamper- or vandal-resistant profile. A screw cap 48 is pressed into an opening above the head of machine screw 57 to prevent access thereto. Similarly, at the fixed end of strap 14, plug 60 is rigidly mounted within receptacle 42 by machine screws 63, which pass through apertures 62 and thread into a nuts 65 (FIG. 11) that are rotationally held fixed within case 30. The heads of machine screws 63 ideally have tamper- or vandal-resistant profiles. Screw caps 46 are pressed into openings above the heads of machine screws 63 to prevent access thereto.

Figure 9:
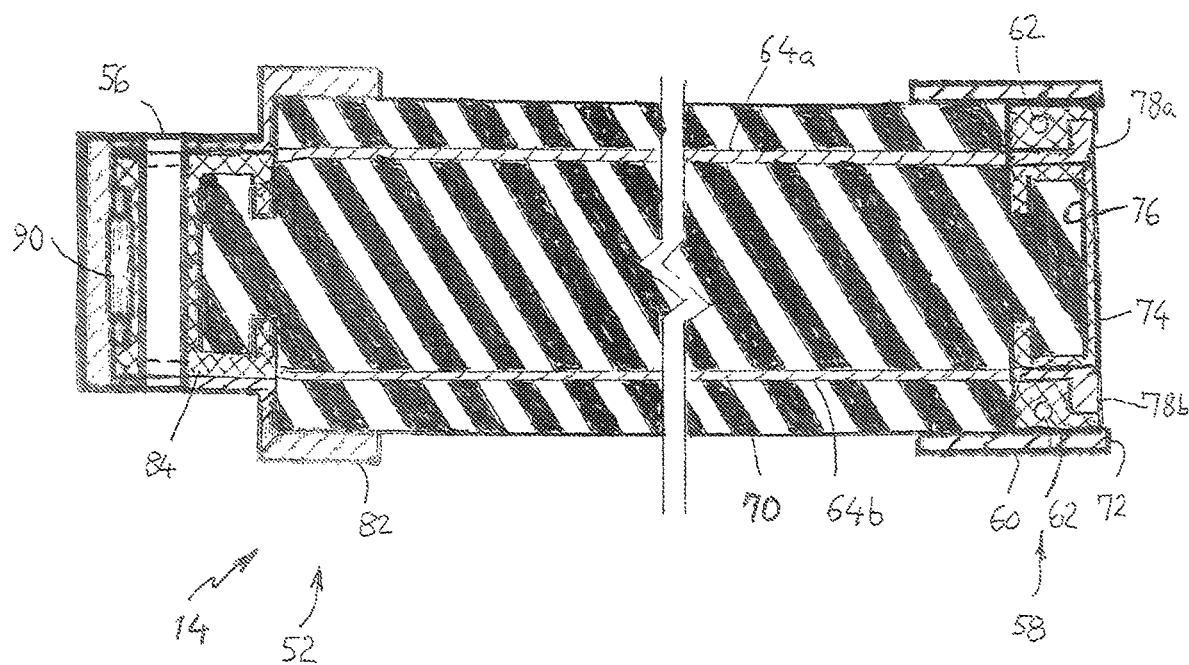
FIG. 9 is a longitudinal cross section view of the strap of FIG. 3 according to one or more embodiments.

FIG. 9 is a longitudinal cross section view of the strap 14 according to one or more embodiments. Referring to FIG. 9, strap 14 may include an elongate body 70 formed of a flexible dielectric material, such as silicone. Embedded within body 70 are first and second electrically conductive wires 64a, 64b running parallel to each other and the longitudinal axis of body 70.

At fixed end 58 of strap 14, body 70 is secured within plug 60. Plug 60 may consist of an outer plug housing 72 and a plug insert 74. Plug housing has an elongate rectangular shape dimensioned to envelop a perimetric portion of strap 14 and is open at its inner and outer ends. Plug insert 74 is dimensioned to be received within plug housing 72. Plug housing 72 and plug insert 74 have one or more holes 62 transversely formed therethrough for mounting to monitoring device 12.

Plug housing 72 may be formed of a corrosion-resistant metal alloy, such as aluminum or stainless steel, and plug insert 74 may be formed of a strong, rigid engineered thermoplastic polymer, such as Nylon, Ryton, or Polysulfone, for example. However, other suitable materials may be used as known by routineers in the art. Plug insert 74 forms at its interior end a tee-slot 76; strap body 70 is secured to plug insert 74 by an interference fit within tee-slot 76, which may be produced during a molding process for strap 14. At its exterior end, plug insert 74 includes upper and lower conductive pads 78a, 78b that are electrically connected to wires 64a, 64b, respectively. When plug 60 is connected within receptacle 42, conductive pads 78a, 78b are electrically coupled to device monitoring circuitry within monitoring device 12 as described in greater detail below.

At pivoting end 52 of strap 14, body 70 is secured within eye fitting 54. Eye fitting 54 may consist of an outer eye housing 82 and an eye insert 84. The outer end of eye housing 82 is closed and rounded. The inner end of eye housing 82 has a profile dimensioned to receive eye insert 84 and to envelop a perimetric portion of strap 14. Eye housing 82 and eye insert 84 have a vertical hole 56 formed therethrough for pivotally mounting to monitoring device 12.

Eye insert 84 forms at its interior end a tee-slot 86; strap body 70 is secured to eye insert 84 by an interference fit within tee-slot 86, which may be produced during a molding process for strap 14. Eye housing 82 may be formed of a corrosion-resistant metal alloy, such as aluminum or stainless steel. Eye insert 84 ideally includes a magnetically-actuated reed switch 90. When eye insert 84 is connected within socket 44 of monitoring device 12, reed switch 90 is positioned near a magnet, thereby actuating the switch. In one or more embodiments, eye insert 84 may be formed of a strong, rigid engineered thermoplastic polymer that is doped with compounds to give it particular semi-conductive properties. Reed switch 90 is electrically connected between wires 64a, 64b via the semi-conductive properties of eye insert 84 to form the equivalent electrical circuit shown in FIG. 10. In other embodiments (not illustrated), eye insert 84 may be formed of a strong, rigid engineered thermoplastic dielectric polymer, and discrete resistors and conductors connect reed switch 90 between wires 64a, 64b to form the equivalent electrical circuit shown in FIG. 10.

Figure 10:
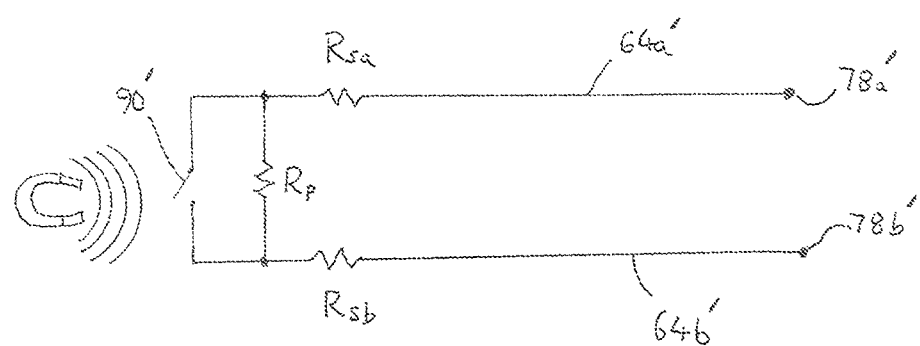
FIG. 10 is a schematic diagram showing an equivalent electrical circuit formed by the strap of FIG. 9 according to one or more embodiments.

FIG. 10 is a schematic diagram showing an equivalent circuit 100 formed by strap 14 cording to one or more embodiments. Referring to FIGS. 9 and 10, circuit nodes 78a', 78b' correspond to conductive pads 78a, 78b of strap 14 and form two points across which resistance or impedance is measured by monitoring device 12. Likewise, conductors 64a', 64b' correspond to wires 64a and 64b of strap 14. Reed switch 90' is connected between nodes 78a', 78b' by two resistances in series: $R_{sa}$ corresponds to the resistance of eye insert 84 along a first electrical path between wire 64a and the end of reed switch 90 that is electrically closest thereto, and $R_{sb}$ corresponds to the resistance of eye insert 84 along a second electrical path between wire 64b and the obverse end of reed switch 90. Resistance $R_p$ corresponds to the resistance of eye insert 84 along a third electrical path that is parallel to reed switch 90, i.e., the resistance of eye insert 84 along a the electrical path between the two ends of reed switch 90.

Referring to FIG. 10, there exist four states of strap 14 that may be ascertained by measurement at nodes 78a', 78b'. When eye insert 84 is connected within socket 44 of monitoring device 12, reed switch 90 is positioned near a magnet, thereby actuating the switch. Assuming reed switch 90 is of the normally closed variant, when ankle monitoring device 10 is under normal operation worn by a user, reed switch 90 is open and the total resistance $R_t$ measured between nodes 78a' and 78b' is:

$$R_t = R_{sa} + R_p + R_{sb} \qquad \text{(Eq. 1)}.$$

If ankle monitoring device 10 is opened, i.e., eye insert 84 is removed from socket 44 of monitoring device 12, reed switch 90 falls away from the effect of the magnet and closes, and the total resistance $R_t$ measured between nodes 78a' and 78b' becomes:

$$R_t = R_{sa} + R_{sb} \qquad \text{(Eq. 2)}.$$

If one cuts strap 14, circuit 100 is opened and the total resistance $R_t$ measured between nodes 78a' and 78b' becomes theoretically infinite. Finally, if one exposes and jumpers wires 64a, 64b within strap 14, the total resistance $R_t$ measured between nodes 78a' and 78b' becomes zero. If reed switch 90 is of the normally open variant, Equations (1) and (2) above are simply reversed.

Figure 11:
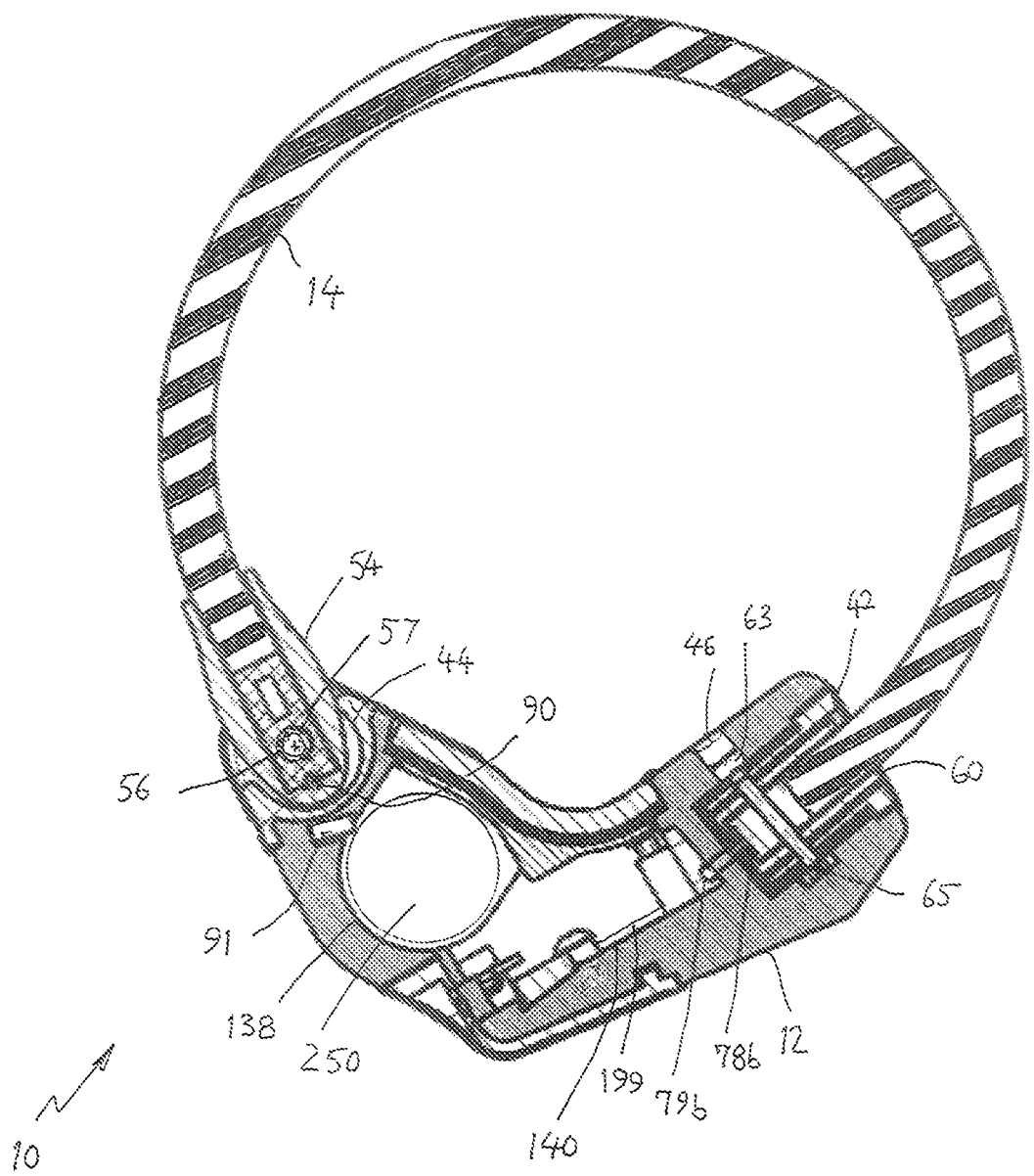
FIG. 11 is a cross section view of the ankle monitor bracelet of FIG. 5 taken along lines 11-11 of FIG. 5.
Figure 12:
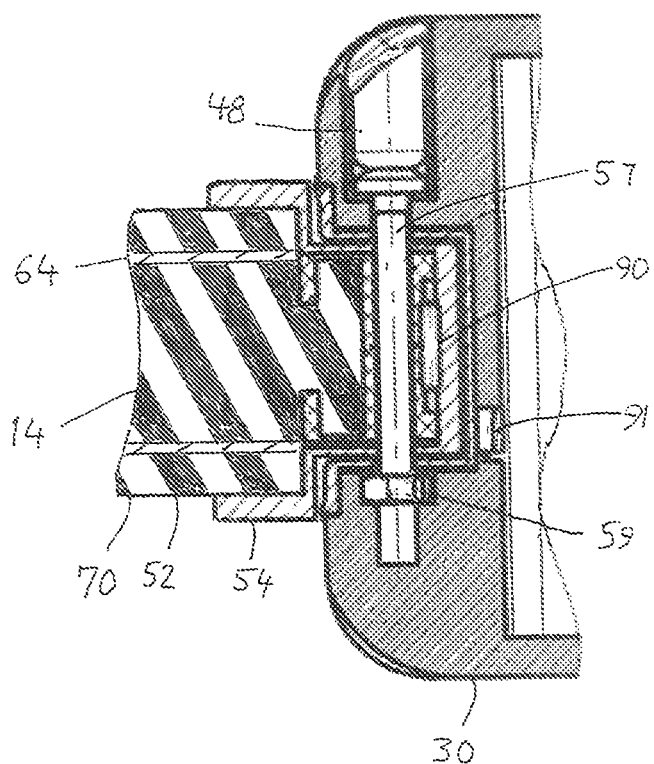
FIG. 12 is a cross section view of the ankle monitor bracelet of FIG. 5 taken along lines 12-12 of FIG. 6.
Figure 13:
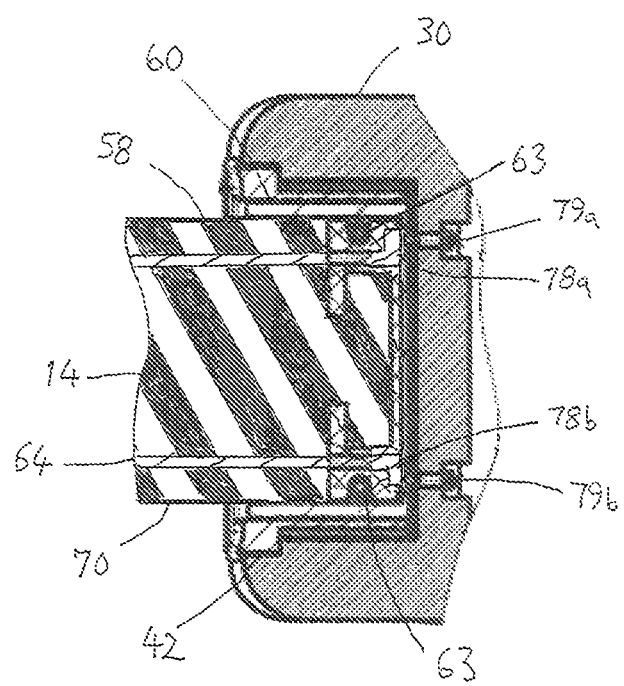
FIG. 13 is a cross section view of the ankle monitor bracelet of FIG. 5 taken along lines 13-13 of FIG. 6.

FIG. 11 is a horizontal cross section of ankle monitor bracelet 10, FIG. 12 is a vertical cross section of pivoting end 52 of strap 14 secured within eye fitting 54, and FIG. 13 is a vertical cross section of fixed end 58 of strap 14 secured within plug 60. Referring to FIGS. 11 and 12, at the pivoting end 52 of strap 14, eye fitting 54 is pivotally mounted within socket 44 by machine screw 57, which passes through aperture 56 and threads into nut 59, which is rotationally held fixed within case 30. In this position, reed switch 90 is disposed near a magnet 91 that causes actuation of reed switch 90. Magnet 91 is preferably a powerful neodymium magnet, although other types of permanent magnets may be used. Screw cap 48 is pressed into the opening above the heads of machine screws 57 to prevent access thereto.

Referring to FIGS. 11 and 13, at the fixed end of strap 14, plug 60 is rigidly mounted within receptacle 42 by machine screws 63, which pass through apertures 62 and thread into nuts 65 that are rotationally held fixed within case 30. The heads of machine screws 63 ideally have tamper- or vandal-resistant profiles. Screw caps 46 are pressed into openings above the heads of machine screws 63 to prevent access thereto. Metallic pads 78a and 78b are contacted by electrically conductive pogo pins 79a, 79b, respectively, which telescopically extend under spring pressure to maintain electrical contact with the pads. The fixed ends of pogo pins 79a, 79b are connected to an electronic monitoring circuit on a printed circuit board 140 located within the interior of case 30.

The interior of case 30 provides a cavity 138 for housing a battery 250, one or more printed circuit boards 199, and other components of an electronic arrangement, as discussed below.

Figure 14:
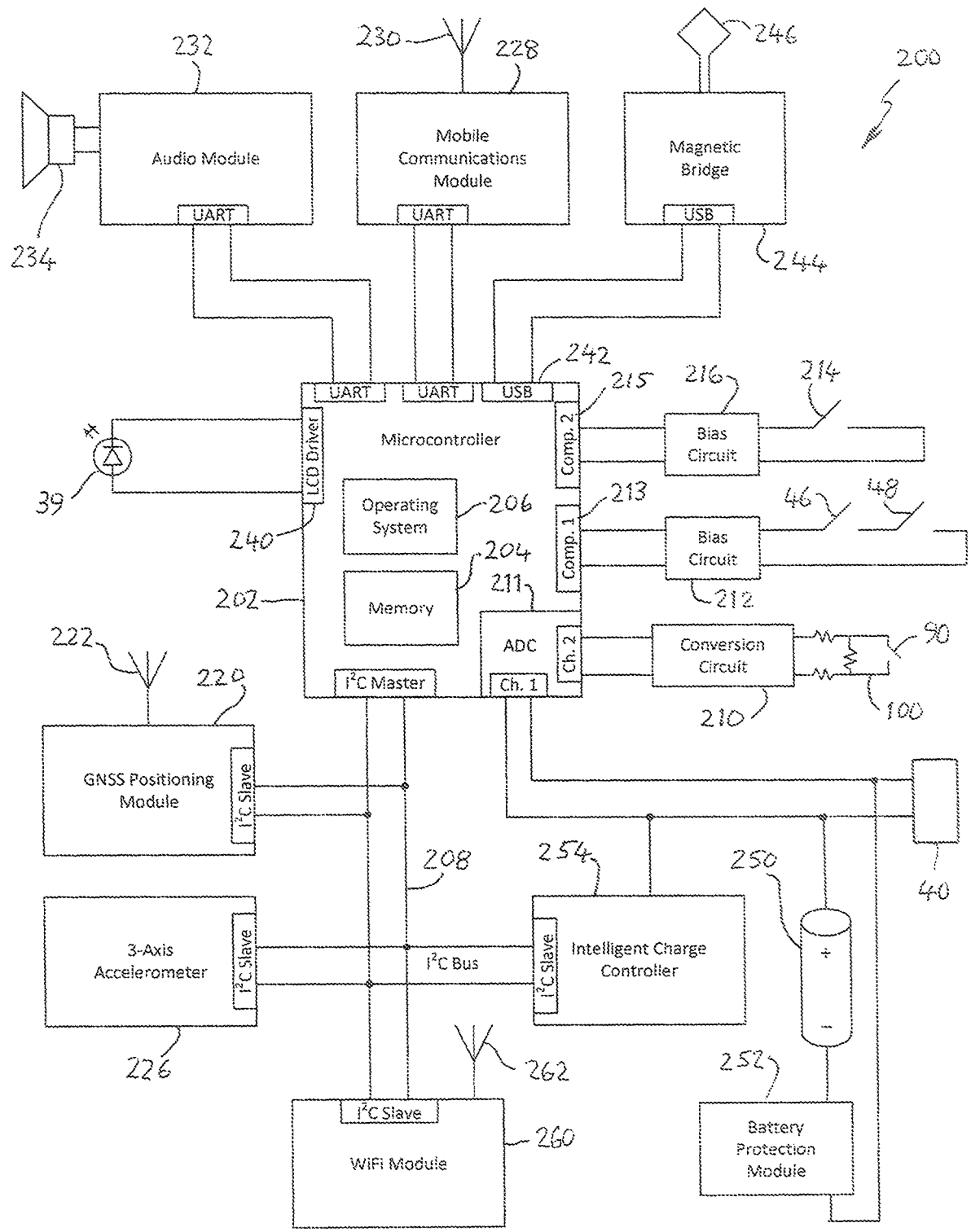
FIG. 14 is a simplified block diagram illustrating an electronic arrangement implementing the ankle monitor bracelet of FIG. 5 according to one or more embodiments.

FIG. 14 is a simplified block diagram illustrating an electronic arrangement 200 of ankle monitor bracelet 10 according to one or more embodiments. For simplicity, the figure does not show power and ground connections, biasing resistors and capacitors, and similar elements. The heart of electronic arrangement 200 is microcontroller 202. Electronic arrangement 200 may be located on one or more printed circuit boards 199 (FIG. 11). However, battery 250 may be discretely located off of a printed circuit board thereby allowing greater battery size and capacity and concomitantly longer operating times without charging.

Microcontroller 202 is ideally an ultra-low-power platform incorporating a high-performance 32-bit reduced instruction set computer (RISC) core, robust highspeed embedded memory 204, a memory protection unit (MPU), and an extensive range of enhanced input/output (I/O) channels and peripherals. Onboard memory 204 may include flash program memory, electrically erasable programmable read only memory (EEPROM), and random access memory (RAM); offboard memory (not illustrated) may also be provided within electronic arrangement 200. Additionally, microcontroller 202 preferably includes a large choice of internal and external clock sources, at least one analog-to-digital converter (ADC), a digital-to-analog converter (DAC), various timers and comparators, a liquid crystal display (LCD) driver, and various watchdog circuits. Moreover, microcontroller 202 preferably supports advanced communications, including inter-integrated circuit ($I^2C$) protocol, serial peripheral interface (SPI), and serial communications via universal synchronous/asynchronous receiver-transmitter (USART), universal asynchronous receiver-transmitter (UART) and universal serial bus (USB). A comprehensive set of power-saving modes allows the design of low-power applications. One such suitable microcontroller, manufactured by STMicroelectronics, is model number STM32L053C8T6. However, other suitable microcontrollers are commercially available. Microcontrollers that are less feature-rich may also be used, with discrete components, such as ADCs, UARTs, et cetera, used to augment necessary features not integrally provided onboard the microcontroller.

Microcontroller 202 includes an operating system 206, which may be written using one or more common computer programming languages, e.g. C++, to implement the algorithms and functionality of FIGS. 15-18, described in greater detail hereinafter. Non-volatile memory elements of memory 204 store various settings for ankle monitor bracelet 10, such as an outgoing communication cycle period during normal and low-power modes, a uniform resource locator (URL) and port of a callback engine to which ankle monitor bracelet 10 sends position report and status messages, a phone number of a relay service to which short message service (SMS) text messages containing position report and status are sent, a device identification, language, Wi-Fi passwords, and a device password. Non-volatile memory elements of memory 204 may also be used to store various critical variables, such as the latitude, longitude and timestamp of the most recent GNSS position fix and security status.

In one or more embodiments, strap 14 is electrically connected to a resistance-to-voltage conversion circuit 210 via metal pads 78a, 78b and pogo pins 79a, 79b (FIGS. 9, 11 and 13). Conversion circuit 210 operates to inject a small constant current into circuit 100 formed by strap 14; the resistance of circuit 100 may then be indirectly ascertained by measuring the voltage across circuit 100 and applying Ohm's Law. The conversion circuit may consist of a constant current source, such as the widely available LM317, an operational amplifier, and some biasing resistors, as well known to those or ordinary skill in the art. Microcontroller 202 is coupled via a first channel of an onboard ADC 211 to conversion circuit 210 to measure voltage and concomitantly determine resistance of circuit 100, thereby ascertaining the security status of strap 14. In other embodiments (not illustrated), the resistance of circuit 100 may be measured using a comparator input of microcontroller 202. In this arrangement, using a simple relaxation oscillator, resistance may converted into a variable frequency, and that frequency may measured using a timer peripheral of microcontroller 202. Such an arrangement is relatively immune to noise, due to its inherent averaging of the incoming signal. The resolution is determined by the length of time over which the sample is counted.

Security screw plugs 46, 48 act as switch elements within a simple circuit. When any screw plug is removed, the circuit is opened. These switch elements may be connected in series and continuously monitored by microcontroller 202 via a comparator input 213 and a simple bias circuit 212. Bias circuit 212 may consist of pull-up or pull-down resistors and bias resisters to create a voltage reference, as known by routineers in the art. In this manner, microcontroller 202 may determine if any screw plugs have been removed. Although screw plugs 46, 48 are illustrated as being wired in series connection, they may be individually monitored by microcontroller 202 as desired.

Electronic arrangement 200 preferably includes a reed switch 214 for detection of magnetic tampering attempts. Reed switch 214 may be located on a printed circuit board with other components of electronic arrangement 200. Reed switch 214 may be connected to and continuously monitored by microcontroller 202 via a comparator input 215 and a simple bias circuit 216. Bias circuit 216 may consist of pull-up or pull-down resistors and bias resisters to create a voltage reference, as known by routineers in the art. If a strong magnet is applied outside case 30 of monitoring device 12 (FIG. 1), reed switch 214 will open (if normally closed), or close (if normally open). Accordingly, the actuation of reed switch 214 by an external magnetic force may be detected by microcontroller 202.

Electronic arrangement 200 preferably includes a GNSS positioning module 220. GNSS module 220 is ideally an integrated circuit that can receive and track multiple GNSS systems: Global Positioning System (GPS), Galileo and GLONASS. Owing to the dual-frequency RF front-end architecture, GLONASS can be processed concurrently with GPS and Galileo signals, thus providing reception of three GNSS systems and allowing for quicker and more accurate position fixes. However, for power conservation, GNSS module 220 may be configured for a single GNSS operation using GPS, Galileo or GLONASS.

GNSS module 220 ideally has an embedded GNSS patch antenna 222, designed to receive and track the L1C/A signals provided at 1575.42 MHz by the Global Positioning System (GPS). Antenna 222 may also receive and process the GLONASS satellite system as an alternative to the U.S.-based Global Positioning System (GPS). The signal provided by antenna 222 may be further filtered and amplified by an internal surface acoustic wave (SAW) filter and low noise amplifier (LNA).

Spoofing is a process whereby a malicious third party tries to control the reported position via a false GNSS broadcast signal, which may result in reporting incorrect position, velocity or time. To combat this, GNSS module 220 ideally includes spoofing detection measures, such as combining a number of checks on the received signals to look for inconsistencies across several parameters, to alert microcontroller 202 (and ultimately law enforcement authorities) when signals appear to be suspicious.

GNSS module 220 preferably supports advanced communications, such as inter-integrated circuit ($I^2C$) protocol and/or serial communications via an integrated UART. FIG. 14 illustrates GNSS module 220 coupled to microcontroller 202 via an $I^2C$ bus 208, with GNSS module 220 configured as a slave and microcontroller 202 configured as a master. However, depending on the intercomponent communication capabilities of the GNSS module and the microcontroller, they may be serially coupled via UARTs or other scheme.

Finally, GNSS module 220 ideally employs a power-optimized architecture with built-in autonomous power-saving functions to minimize power consumption at any given time. GNSS module 220 may be used in two operating modes: Continuous mode for best performance or Power Save Mode for optimized power consumption. A suitable GNSS module, manufactured by U-blox, is model number SAM-M8Q-0-10. However, other suitable GNSS modules are commercially available.

Electronic arrangement 200 preferably includes an accelerometer 224. Accelerometer 224 is preferably a small, ultralow power, 3-axis accelerometer with high resolution (e.g. 13-bit) measurement at up to ±16 G. Accelerometer 226 is shown configured as an I²C slave and is coupled to microcontroller 202 via bus 208. However, digital output data from accelerometer 224 may accessed by microcontroller 202 via a SPI, UART, interrupt, or other digital interface, as known in the art. Accelerometer 224 measures the static acceleration of gravity in tilt-sensing applications, as well as dynamic acceleration resulting from motion or shock. High resolution (e.g. 3.9 mg/LSB) enables measurement of inclination changes less than 1.0 degree. Ideally, accelerometer 224 includes activity/inactivity sensing to detect the presence or lack of motion by comparing the acceleration on any axis with user-set thresholds; low power modes enable intelligent motion-based power management with threshold sensing and active acceleration measurement at extremely low power dissipation. A suitable accelerometer, manufactured by Analog Devices, is model number ADXL345BCCZ. However, other suitable accelerometers may be commercially available.

Electronic arrangement 200 preferably includes a mobile communications module 228. Mobile communications module 228 may support Global System for Mobile Communications (GSM), Code Division Multiple Access (CDMA), General Packet Radio Services (GPRS), Long Term Evolution (LTE), Enhanced Data GSM Environment (EDGE), 4G, 5G, or any other scheme for electronic cellular communications, either extent or yet to be developed. For instance, mobile communications module 228 may be a quad-band (850/900/1800/1900 MHz) GSM/GPRS solution that can transmit voice, SMS text, and data information with low power consumption. Mobile communications module 228 may support a number of intercomponent communication schemes, including I²C, SPI, USB, and/or serial communications via an onboard UART. FIG. 14 shows mobile communications module 228 serially coupled to microcontroller 202 via UARTs located within each device. Mobile communications module 228 may be controlled by microprocessor 202 using a standard and/or enhanced "AT" modem command set, as well understood by practitioners in the art. In one or more embodiments, mobile communication module 228 includes an integrated, onboard antenna 230. A suitable mobile communications module, manufactured by Shanghai SIMcom Wireless Solutions, Ltd., is model number SIM800C. However, other suitable mobile communications modules may be commercially available.

Electronic arrangement 200 preferably includes an audio module 232 driving a small speaker 234 to provide audible notifications to the wearer of ankle monitor bracelet 10. Speaker 234 is located within case 30 adjacent to speaker aperture 38 (FIG. 1) so as to effectively be heard by a wearer of ankle monitor bracelet 10. Audio module 232 may be a discrete module, coupled to microcontroller 202 via serial communication using UARTs (as illustrated), SPI, USB, I²C, or other scheme. Rather than a discrete module, audio module 232 may be integrated within microcontroller 202, mobile communications module 228, GNSS positioning module 220, or another component. For example, SIM800C, manufactured by Shanghai SIMcom Wireless Solutions, Ltd., is a mobile communications module that includes a suitable audio module as well.

Regardless of how implemented, audio module 232 includes on board memory, a sound processor to produce analog sounds, and an amplifier to drive speaker 234. Audio module 232 is programmed to store various audio notifications in one or more languages, such as English and Spanish. These notifications may be used to warn a wearer of ankle monitor bracelet 10 of actual or approaching violations of geographical restriction violations and other conditions as will occur to routineers in the art.

In addition to providing audio notifications, ankle monitor bracelet 10 may provide visual indications, such as by one or more LEDs 39. However, a liquid crystal display (LCD) or other visual apparatus, either extent or yet to be developed, may also be used. Depending on the specific capabilities of microprocessor 202, LEDs 39 may be directly driven by on board driver circuitry 240, as illustrated, or additional discrete driver circuitry (not illustrated) may be provided as known by routineers in the art.

Various visual notification schemes may be provided. For example, a first tri-colored LED may be used to indicated geographical position information: A green display may indicate the wearer is within the allowed geographical zone, an amber display may indicate the wearer is near a boundary of the allowed geographical zone, and a red display may indicated a violation—the wearer has exited the allowed geographical zone. Similarly, a second tri-colored LED may indicate operational or health status of ankle monitor bracelet 10. For instance, a green display indicates normal operating status, an amber display may indicate low battery charge, and a red flashing display may indicate loss of GPS or GSM signal. Other variations may occur to those of skill in the art.

A USB or other data port 242 may be provided by microprocessor 202 for updating electronic parameters, such as passwords and software revisions, by authorized personnel. For convenience, a magnetic bridge 244 with integrated magnetic-coupling antenna 246 may be provided as part of electronic arrangement 200 to allow access to USB port 242 without having to open cover 32 of case 30 (FIG. 1). Magnetic bridge 244 converts a digital signal to an analog signal, which may be magnetically coupled to an analogous magnetic-USB adapter located externally of case 30. Various magnetic-USB adapters are commercially available that will allow a technician to readily connect a laptop or the like to microprocessor 202 via bridge 244. Accordingly, operating system 206 of microcontroller 202 may be modified, i.e., re-uploaded without opening case 30. Special proprietary software provided to an authorized technician for uploading firmware may be used to send a secure, password-protected request for interaction to microcontroller 202.

Electronic arrangement 200 is powered by a battery 250. Battery 250 is preferably a high-capacity rechargeable battery. Battery 250 may be a lithium-ion polymer battery, a nickel-cadmium battery, a lead-acid battery, or other suitable battery, either extant or yet to be developed, as understood in the art. Battery 250 may be located on a printed circuit board with other components of electronic arrangement 200, or it may be located separately. For simplicity, FIG. 14 omits power connections between battery 250 and other components of electronic arrangement 200.

Battery 250 may be operatively coupled to a battery protection module 252. Battery protection module 252 protects battery 250 from damage or lifetime degradation due to overcharging, over-discharging, or over-current conditions. Battery protection module 252 may provide constant-current constant-voltage linear charging of battery 250 via power port 40. Suitable battery protection modules are commercially available from manufactures including Analog Devices, Linear Technology, and Texas Instruments.

As illustrated by FIG. 14, the terminals of battery 250 may be sampled by microcontroller 202 via a channel of ADC 211 for determining the current output voltage. In other embodiments (not illustrated), battery protection module 252 may include a communications channel, such as SPI or I$^2$C, that allows microcontroller 202 to directly query battery protection module 252 to obtain the current voltage of battery 250.

Regardless, because battery voltage may fluctuate at any given moment in time according to different modules consuming power, electronic arrangement 200 may include an intelligent charge controller 254, that is used to recognize battery charge level more precisely, providing battery 250 charge level in percentage. Intelligent charge controller 254 is ideally coupled as an I2C slave to I2C bus 208 to provide microcontroller 202 access to its data and control registers. However, intelligent charge controller 254 may be coupled to microcontroller 202 using other communication schemes, such as SPI, USB, and the like.

An intelligent charge controller, also known as a battery fuel gauge or power management intelligent controller, is essentially a coulomb counter that provides precision measurements of current, voltage, and temperature and employs a robust algorithm to compensate for battery diversity tolerance, cell aging, temperature, and discharge rate to yield an accurate battery state of charge and remaining capacity in milliampere-hours (mAh). As the battery approaches the critical region near empty, more sophisticated intelligent charge controllers use an algorithm that invokes special compensation that eliminates any error and provide three methods for reporting the age of the battery: Reduction in capacity, increase in battery resistance, and a cycle odometer. A suitable intelligent charge controller, manufactured by Maxim Integrated Products, Inc., is model number MAX17055ETB+T. However, other suitable devices may be used.

Electronic arrangement 200 may include an optional Wi-Fi module 260 with integrated antenna 262. Wi-Fi module 260 ideally supports Institute of Electrical and Electronics Engineers (IEEE) 802.11 a/ac/b/g/n and Wi-Fi Alliance protocols and includes an integrated transmission control protocol/internet protocol (TCP/IP) protocol stack. Wi-Fi module 260 may be connected as an I$^2$C slave to I$^2$C bus 208, although other intercomponent connection schemes may be used. Wi-Fi module 260 may be controlled by microcontroller 202 using a standard and/or enhanced "AT" modem command set, as well understood by practitioners in the art. One or more Wi-Fi passwords may be written to mircocontroller's 202 non-volatile EEPROM by authorities as described below with respect to FIG. 18. Wi-Fi module 260 may allow a direct wireless Wi-Fi internet connection to authorities when a GPRS, LTE or other cellular data connection is weak or absent, such as when ankle monitor bracelet 10 is located deep indoors. Suitable Wi-Fi modules are commercially available from manufacturers including Advantech, Digi, Espressif, Microchip, Murata, Redpine, Silicon Labs, and Texas Instruments. Wi-Fi module 260 may be integrated with mobile communications module 228 (not illustrated).

FIGS. 15-18 are flow chart diagrams that outline algorithm steps performed by microcontroller 202, under direction of custom-programmed operating system 206 (FIG. 14), according to one or more embodiments. These figures employ a standard flow chart convention where decisions are represented by a rhomboidal symbol and actions are represented by a rectangular symbol. The program logic flow between the various decisions and actions is depicted by single-lined arrows. For instance, each decision rhombus contains an interrogatory. If the interrogatory, when evaluated, is true or yes, the program flow is indicated by the arrow leading from that rhombus designated with a "T." Likewise, if the interrogatory is false or no, the program flow is indicated by the arrow leading from that rhombus labeled with an "F." Program variables are indicated in uppercase.

On power up, microcontroller 202 examines all existing modules to ensure that none of them has fallen into an error state. If there is no errors, microcontroller 202 executes certain program steps at various cycle times. The cycle times indicated below are preferred, but other cycle periods may be used as desired.

Figure 15:
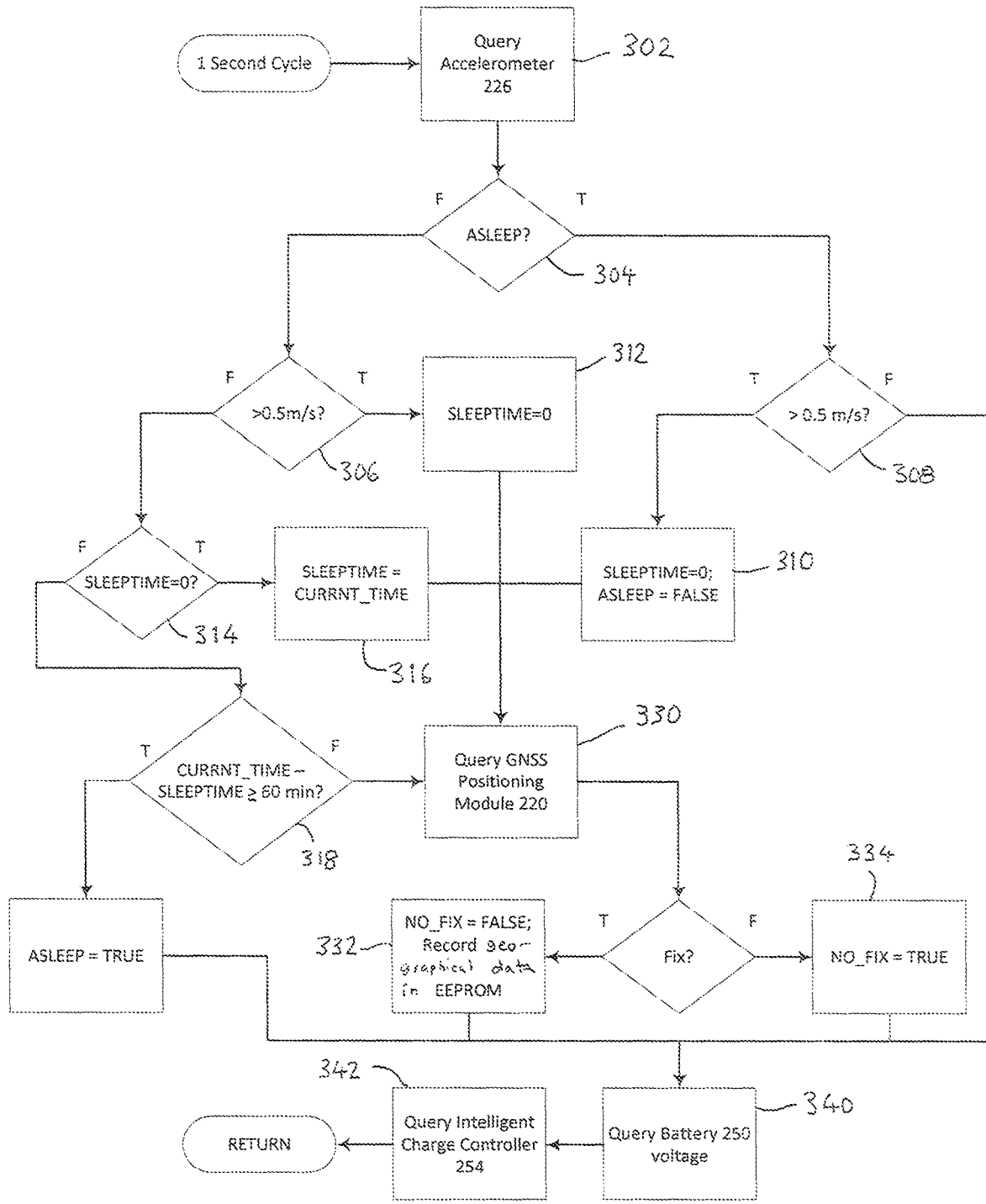
FIGS. 15-18 are simplified flow chart diagrams illustrating algorithmic logic employed by the electronic arrangement of FIG. 14 according to one or more embodiments.

FIG. 15 is a flowchart diagram outlining a sequence of steps microcontroller 202 performs every second, although other cycle times may be used. If ankle monitor bracelet 10 does not move, or has moved with acceleration less than 0.5 m/s for 60 minutes, microcontroller 202 will set flag variable ASLEEP=TRUE and will put GNSS positioning module 220 in low-power or power-off state to extend battery life. Other modules may also be placed in a low-power or power-off state as appropriate. However, mobile communications module 228 preferably remains active, awaiting incoming commands should authorities need to get the current geolocation and state of ankle monitor bracelet 10. Once movement is detected, microcontroller 202 will set flag ASLEEP=FALSE and return all modules to the normal operating state.

Specifically, at step 302, microcontroller 202 requests the state of 3-axis accelerometer 226 to determine current motion. Depending on the state of flag variable ASLEEP and the movement reported by accelerometer 226 (interrogatories 304, 306, 308), program flow proceeds down one of four paths: If ASLEEP is true, i.e., ankle monitor bracelet 10 is in a low power state, and movement does not exceed 0.5 m/s, ankle monitor bracelet 10 remains in the low power state and microcontroller proceeds to step 340; no GNSS position is obtained, and ankle monitor bracelet 10 may or may not transmit any data to authorities, depending on its configuration, as described later. If ASLEEP is true and movement exceeds 0.5 m/s, at step 310, flag ASLEEP is set to FALSE, and variable SLEEPTIME is reinitialized to zero. Program flow then proceeds to step 330 to obtain GNSS position.

If, on the other hand, flag ASLEEP is false and movement exceeds 0.5 m/s, at step 312, variable SLEEPTIME is reinitialized to zero. Program flow then proceeds to step 330 to obtain GNSS position. Finally, if flag ASLEEP is false and movement does not exceed 0.5 m/s, this indicates a period of inactivity has commenced. At interrogatory 314, variable SLEEPTIME is evaluated. A SLEEPTIME value of zero indicates a first instance of inactivity, and at step 316, SLEEPTIME is set to the current time. Program flow then proceeds to step 330 to obtain GNSS position. A SLEEPTIME value of other than zero indicates an ongoing period of inactivity. Interrogatory 318 determines whether the duration of inactivity has reached 60 minutes uninterrupted. If the difference of variable SLEEPTIME from the current time is not greater than or equal to 60 minutes, program flow proceeds to step 330 to obtain GNSS position. But, if the current time less SLEEPTIME is greater than or equal to 60 minutes, flag ASLEEP is set to TRUE at step 320, and program flow proceeds to step 340; no GNSS position is obtained, and ankle monitor bracelet 10 may or may not transmit any data to authorities, depending on its configuration, as described later.

The 0.5 m/s and 60 minute threshold values are preferred, but other values may be used, and in one or more embodiments may be stored as variables that may be altered by authorities as described below with respect to FIG. 18.

When not in low-power mode, GNSS positioning module 220 with integrated antenna 222 receives navigation radio signals from GNSS satellites, including almanac and ephemeris data, and calculates its geographical position from the signals. GNSS positioning module 220 generally updates its position every second, provided it has acquired signals from four or more satellites. At step 330, microcontroller 202 queries GNSS module 220. If GNSS module 220 has a position fix, at step 332, latitude, longitude, and the timestamp are recorded by microcontroller 202 in its EEPROM, and flag variable NO_FIX is set to FALSE; if GNSS module 220 has no position fix, at step 334, flag NO_FIX is set to TRUE. In this manner, microcontroller 202 records latest geolocation data to non-volatile memory, having it in case of lost signal, to inform authorities about last reported position of ankle monitor bracelet 10. Program flow proceeds to step 340.

At step 340, microcontroller 202 either samples battery voltage or queries battery protection module 252 to obtain the current voltage of battery 250. Because battery voltage may fluctuate according to which modules are consuming power at any moment in time, microcontroller 202 then queries, at step 342, intelligent charge controller 254 to obtain battery charge level in percentage. Battery voltage and charge values are stored in BATTERY_VOLTAGE and BATTERY_CHARGE variables, respectively.

Figure 16:
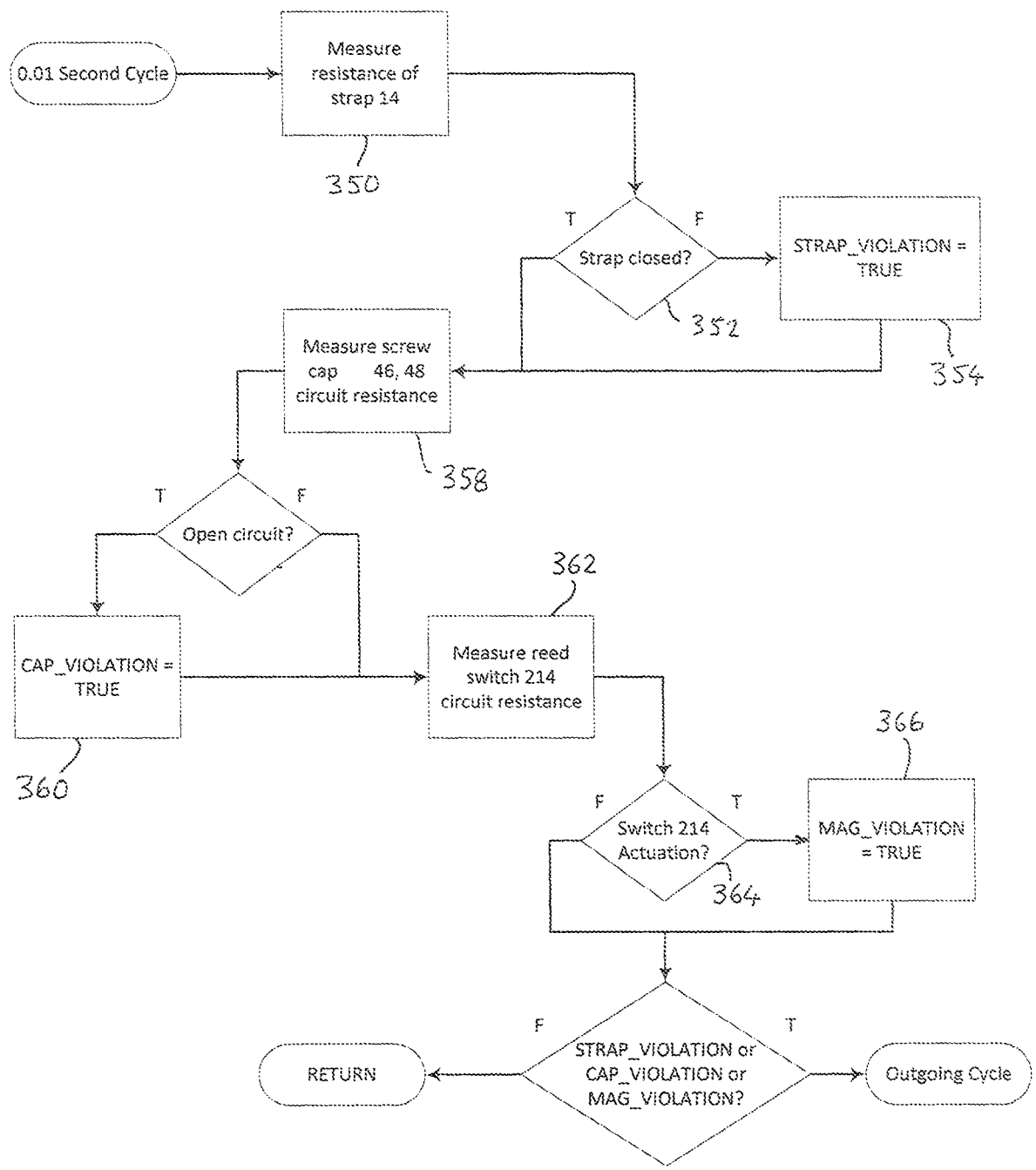

FIG. 16 is a flowchart diagram outlining a sequence of steps microcontroller 202 performs every 10 ms to check the security status of ankle monitor bracelet 10, although other cycle times may be used. At step 350, the resistance of circuit 100 within strap 14 is measured by microcontroller 202, as described above with respect to FIG. 14. As discussed with respect to FIG. 10, microcontroller 202 can differentiate between a closed bracelet, an open bracelet, a cut strap, and a short-circuited strap. At interrogatory 352, any resistance other than that of a normally closed strap will cause microcontroller 202 to set flag variable STRAP_VIOLATION to TRUE at step 354. Flag STRAP_VIOLATION may alternatively be set to a value such as OPEN, CUT, or SHORTED, for example, depending on the measured resistance.

Program flow then proceeds to step 358, where the circuit resistance of the screw caps is measured. If any screw cap 46, 48 is removed, an open circuit is measured, and at step 360, flag variable CAP_VIOLATION is set to TRUE by microcontroller 202. At step 362, the resistance across reed switch 214 is measured to determine any magnetic hacking attempts. Per interrogatory 364, if reed switch 214 has been actuated under the influence of a local magnetic field, at step 366 flag variable MAG_VIOLATION is set to TRUE by microcontroller 202. STRAP_VIOLATION, CAP_VIOLATION, and MAG_VIOLATION flags are stored by microcontroller 202 in its EEPROM.

Figure 17:
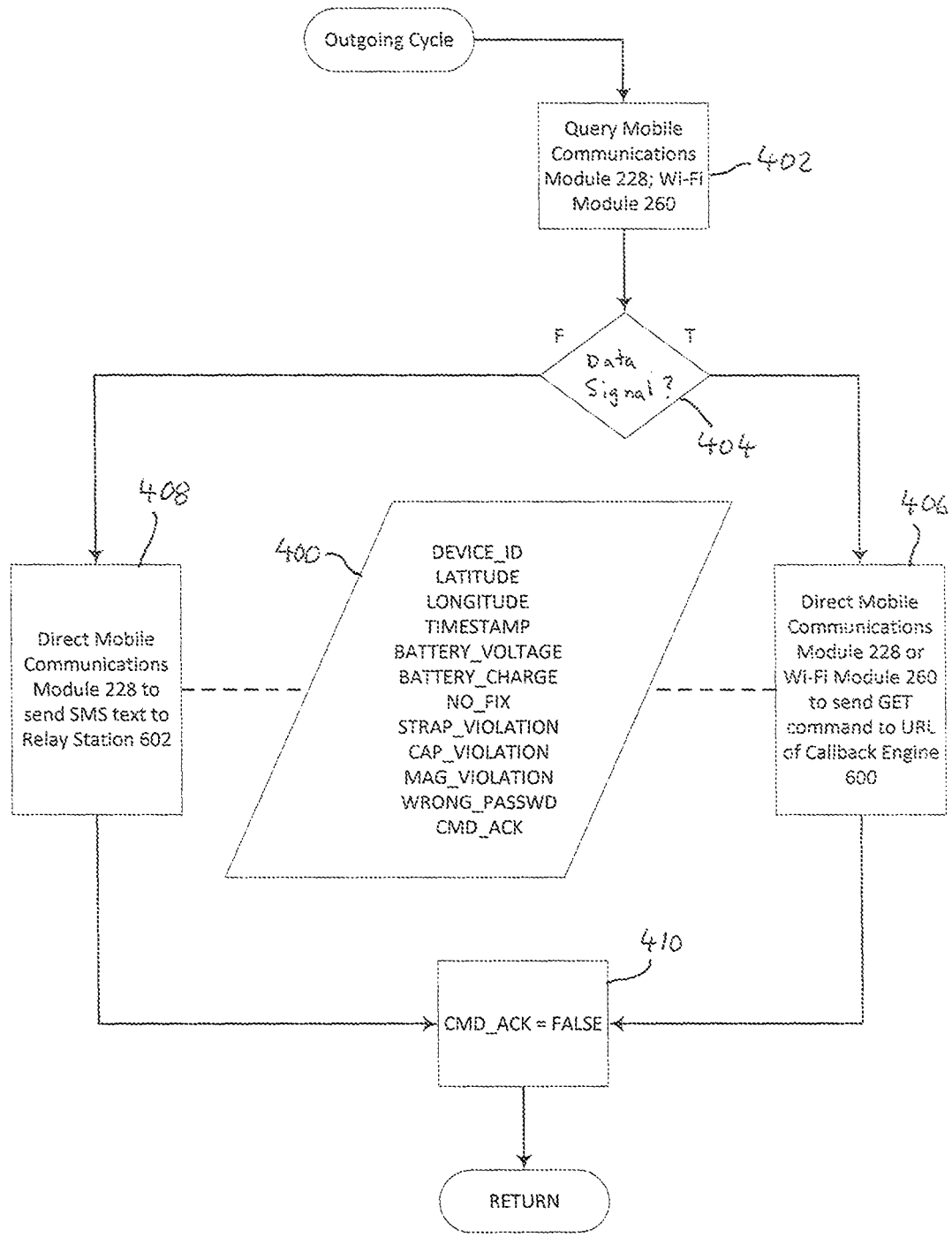

At interrogatory 370, if any of the violation flags is true, program flow proceeds immediately to the outgoing cycle process steps of FIG. 17 to immediately notify authorities of the violation. Otherwise, the process steps of FIG. 16 repeat in 10 ms. Note that none of the violation flags are reset within the process steps of FIG. 16. This means that any violation lasting at least 10 ms will be detected, recorded and transmitted to authorities. Transmission of the violation will continue until ankle monitor bracelet 10 receives confirmation of the violation from the authorities, as described below, and violation flag variables are reset.

FIG. 15 is a flowchart diagram outlining a sequence of steps microcontroller 202 performs to send outgoing messages 400 with geographical position and status reports. The steps of FIG. 17 are performed periodically at an interval that may be set and varied by authorities while ankle monitor bracelet 10 is worn by an offender. For example, reports maybe sent every minute or less for riskier offenders to every 10-15 minutes for others. When ankle monitor bracelet 10 is in low-power mode, i.e., flag ASLEEP is true, reports may be sent less frequently, without current GNSS position data, to report battery status, or not at all. The steps of FIG. 17 are also performed on an on-demand or as needed basis, including to acknowledge an incoming command from authorities or in response to a security violation such as a cut strap or removed screw cap.

Message 400 includes all the information received from the modules and components of electronic arrangement 200, as described above, including: DEVICE_ID (which may be a subscriber identity module (SIM) card unique identifier), LATITUDE, LONGITUDE, TIMESTAMP, BATTERY_VOLTAGE, BATTERY_CHARGE, NO_FIX, STRAP_VIOLATION, CAP_VIOLATION, MAG_VIOLATION, WRONG_PASSWD, and CMD_ACK. WRONG_PASSWD and CMD_ACK are described below with respect to FIG. 18.

At step 402 microcontroller 202 queries mobile communications module 228 to check availability, i.e., current connectivity, of the GPRS other cellular data network. Microcontroller 202 also queries Wi-Fi module 260, if provided, to check availability, i.e., current connectivity, of a Wi-Fi data network. Depending on the measured data signal strength, at interrogatory 404 microcontroller 202 sends message 400 either by cellular/Wi-Fi internet or by SMS text message.

In particular, if the measured data signal strength is adequate for cellular/Wi-Fi internet service, at step 406 microcontroller 202 formats message 400 for direct transmission to an internet server and directs mobile communications module 228 or Wi-Fi module 260 as appropriate to transmit formatted message 400 to the defined URL and port of a callback engine 600. In one or more embodiments, message 400 is formatted according to the hyper text markup language (HTML) GET method for processing forms, wherein the parameters DEVICE_ID, LATITUDE, LONGITUDE, TIMESTAMP, et cetera, are appended as a string to the URL, separated by a question mark character. The parameters may be passed as named or unnamed parameters, as understood by routineers in the art. Additionally, the parameters passed as arguments to the URL request may be encrypted by microcontroller 202 according to a predetermined method to hamper hacking attempts. The parameters may also be sent using an HTML POST command, which allows secure encrypted communication between ankle monitor bracelet 10 and callback engine 600.

If, on the other hand, the measured data signal strength is weak or unavailable for cellular/Wi-Fi internet service, at step 408 microcontroller 202 formats message 400 for transmission as an SMS text message and directs mobile communications module 228 to transmit it to a relay station 602. The various parameters with in the body of the text message may be encrypted by microcontroller 202 according to a predetermined method to hamper hacking attempts. As described in greater detail in FIG. 19, relay station 602 will in turn reformat the message and transmit it to callback engine 600, preferably using the HTML POST method for processing forms, as known to routineers in the art. One suitable relay service provider is Twilio, which performs a myriad of wireless and internet services. Twilio provide a cellular service in which a special short phone number validates SMS only from devices having Twilio SIM cards.

Figure 18:
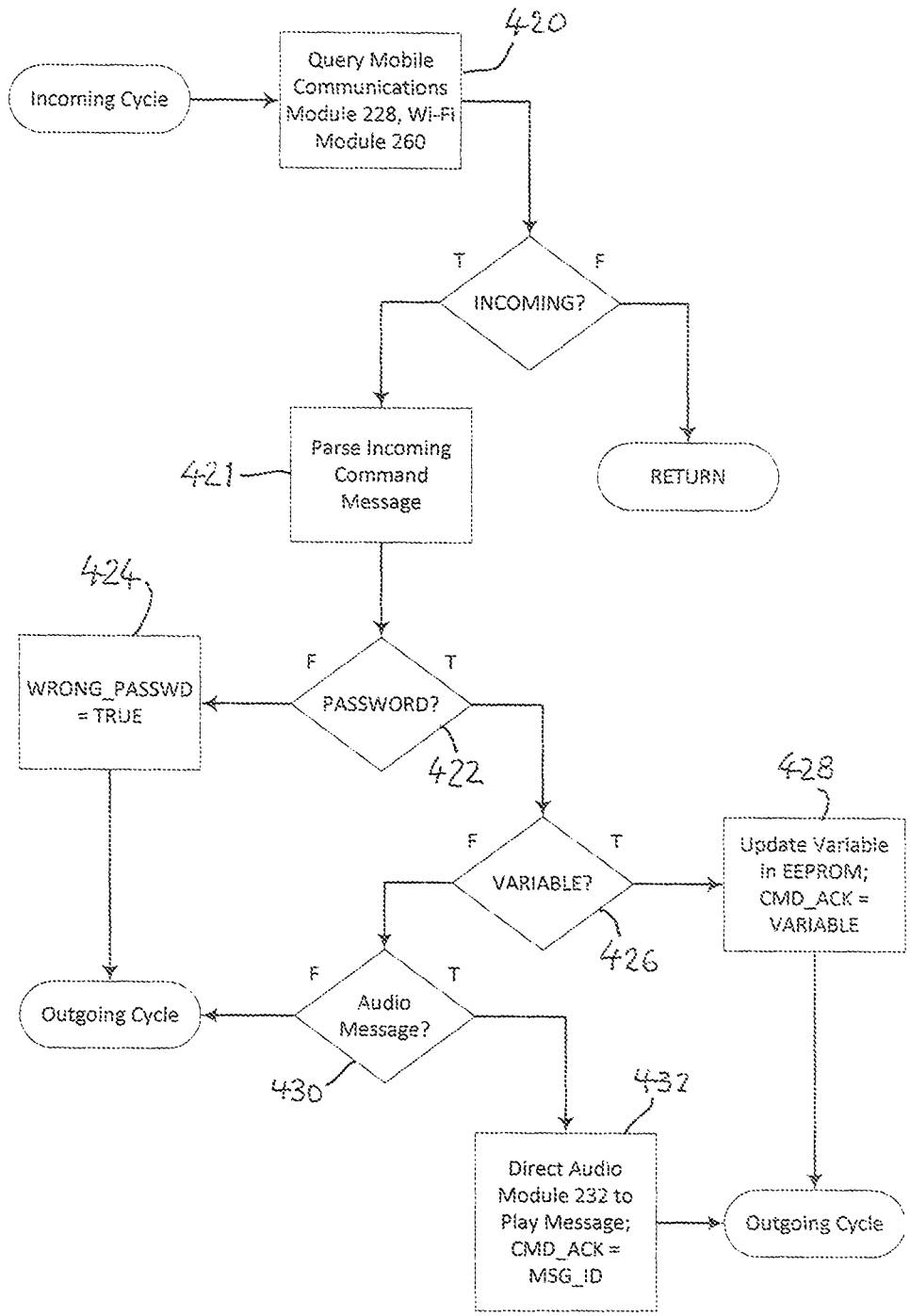

After message 400 has been sent, either by cellular/Wi-Fi internet service or by SMS text, at step 410 the CMD_ACK variable is set by microcontroller 202 to FALSE, thereby resetting the variable for any future incoming commands, as described with respect to FIG. 18.

FIG. 18 is a flowchart diagram outlining a sequence of steps microcontroller 202 performs to process incoming messages. In one or more embodiments, at step 420 microcontroller 202 queries mobile communications module 228 and Wi-Fi module 260, if provided, to determine whether an incoming command message was received. Incoming command messages may be received by mobile communications module 228 via GPRS internet data or via SMS text message for example, and mobile communications module 228 may be configured to receive and buffer the incoming command message until queried by microcontroller 202. Likewise, incoming command messages may be received by Wi-Fi module 260, which may buffer messages until queried by microcontroller 202. If there is no incoming command message, the process ends. This cycle is repeated frequently, e.g. every second, to ensure expeditious handling of incoming commands. In other embodiments, interrupt processing is used to invoke the handling of incoming commands; mobile communications module 228 and/or Wi-Fi module 260 directly notifies microcontroller 202 of an incoming command message via a hardwired interrupt channel.

Regardless, processing continues to step 421, where microcontroller 202 parses the incoming command message to determine its constituents. At interrogatory 422, microcontroller 202 determines whether the incoming command message is authorized. Every response from callback engine 600 must contain a password, which is cross-checked against the password stored in non-volatile memory of microcontroller 202. If the incoming command message password is incorrect, the command is unauthenticated, and at step 424 microcontroller 202 will set flag variable WRONG_PASSWD to TRUE; process immediately flows to the outgoing cycle of FIG. 17, whereby the WRONG_PASSWD flag is sent to callback engine 600 to notify authorities of a possible attempted hacking. If the incoming command message password is authenticated, process continues to interrogatory 426.

In one or more embodiments, callback engine 600 may revise a number of ankle monitor bracelet settings, including updating its password, audio playback language, outgoing communication cycle period during normal and low-power modes, the uniform URL and port of callback engine 600, the phone number of SMS relay station 602, the period of inactivity to enter low-power mode, the settings of LEDs 39, the velocity threshold to determine inactivity, et cetera. If the incoming command message includes instructions to update one or more system variables, at step 428, microcontroller 202 will update the variable(s) in its non-volatile EEPROM memory. Microcontroller 202 then updates the variable CMD_ACK to reflect the variable(s) updated and proceeds to the outgoing cycle of FIG. 17 to send the command acknowledgement to callback engine 600.

Audio module 232 includes non-volatile memory in which a number of pre-recorded audio messages may be stored. Ideally, both English and Spanish variations of audio notifications are provided for the user. The incoming command message may include a command to play one or more messages, which is assessed at interrogatory 430. If so, at step 432, microcontroller 202 directs audio module 232 to play the requested message(s), updates the variable CMD_ACK to reflect the message(s) played, and then proceeds to the outgoing cycle of FIG. 17 to send the command acknowledgement to callback engine 600.

If the incoming command message contains no instructions to update settings or play messages, program flow proceeds to the outgoing cycle of FIG. 17. This arrangement allows callback engine 600 at any time to request an updated position and status report from ankle monitor bracelet 10.

Figure 19:
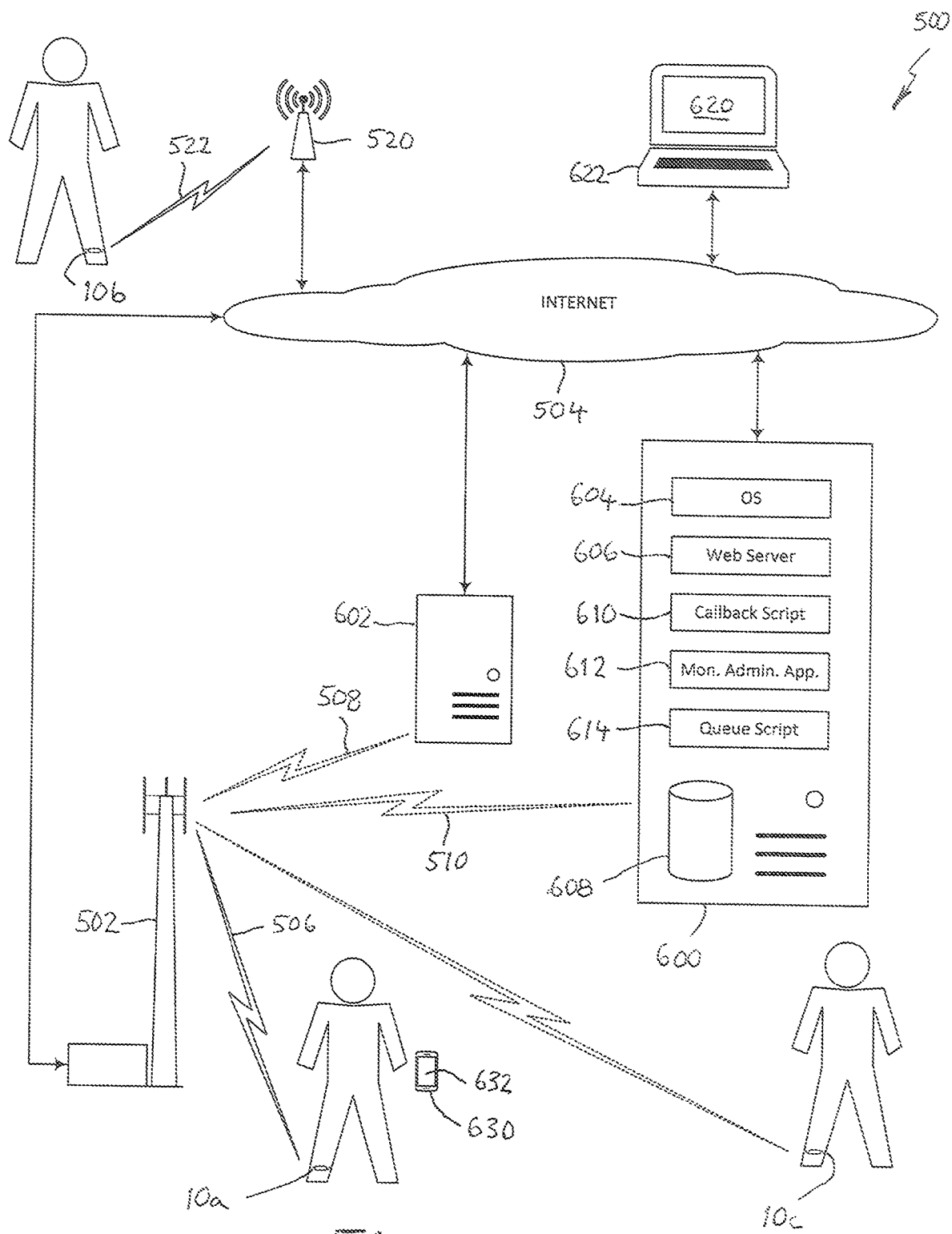
FIG. 19 is a conceptualized block diagram of an offender tracking system and method for tracking persons using a plurality of ankle monitor bracelets such as shown in FIG. 5.

FIG. 19 is a conceptualized block diagram of a system 500 for tracking persons using a plurality of ankle monitor bracelets 10 according to one or more embodiments. System 500 includes a callback engine 600 that handles incoming and outgoing communications with ankle monitor bracelets 10. Callback engine 600 is preferably a high-capacity web server that hosts one or more web server software applications for selectively and securely managing a plurality of ankle monitor bracelets 10. Callback engine 600 preferably has the memory capacity and redundant functional capabilities of at least a powerful rack-mount server computer to support a large number of concurrent processes and maintain high-throughput communications, and more preferably still, is sufficiently capable to support several hundred concurrent client connections. As known in the art, callback engine 600 may be equipped with a local display monitor and input keyboard, keypad, and/or input pointing device (not illustrated) for interfacing with a local system administrator.

As is well known in the computer field, callback engine 600 preferably contains a processor which executes instructions retrieved from a memory device to control the reception and manipulation of input data, the transfer of data to other computers, and the output and display of data on output devices. A memory bus is used by the processor to access RAM, read only memory (ROM), or other memory. Memory is used for storing input data, processed data, and software in the form of instructions for the processor. The processor is coupled to a peripheral bus to access input, output and storage devices, possibly including a display monitor, removable disc drive (e.g. CD-ROM), hard disk drive, input keyboard, mouse, universal serial bus (USB) device, and network interface. As this general computer technology is commonplace and well understood in the art, it is neither illustrated nor discussed further herein.

Callback engine 600 includes computer software as an integral part. Computer software includes an operating system (OS) 604, a web server application 606, and a database system 608. Computer software also includes a callback script 610, a monitor administration module 612, and a queue script 614—custom code written to implement the processes discussed herein. The software may also include an optional web browser application, modem control utilities, and an optional network firewall application. Computer software may reside in RAM, ROM, hard disk drives, CD-ROMs, other storage media, or combinations thereof. Additionally, software may be stored at a separate computer (not illustrated) and accessed over a network.

Operating system 604, which controls computer resources, peripherals, and the execution of software applications for callback engine 600, is preferably an industry-standard multiuser multitasking web server OS such as an open source Linux® variant. Other appropriate operating systems may also be used. As OS technology is commonplace and well understood in the art, the operating system is not discussed further herein.

Web sever application 606, which is often bundled with the OS, enables ankle monitor bracelets 10 to access callback engine 600, via HTML GET or POST commands, for example, to transmit in real-time location and status reports. Apache is a popular open source hypertext transport protocol (HTTP) web server application that is used with Linux® Windows® and other operating systems. Utilizing standard ethernet and TCP/IP networking techniques, callback engine 600 is connected to internet 504. With communications managed by web server application 606, callback engine 600 is accessible via a static internet protocol (IP) address from devices having internet access located anywhere in the world. Web server applications are commonplace and well known in the art and accordingly are not discussed further herein.

Web server application 606 functions by listening for connections made by devices over internet 504 and thereafter by selectively transmitting data therebetween. Callback script 610 and monitor administration application 612 are custom software programs and files that work hand-in-hand with web server application 606 to implement the monitoring and tracking method according to one or more embodiments of the invention. Additionally, monitor administration application 612 and web server application 606 together generate an interactive dynamic website interface 620 that may accessed by law enforcement authorities via a web browser on a remote computer device 622 for administration of ankle monitor bracelets 10, as described below.

Callback engine 600 may store historical and current position and status reports from many ankle monitor bracelets 10, as well as associated data. Associated data may include ankle monitor bracelet settings (e.g., reporting period, language, et cetera) and geographical descriptions defining zones in which a wearer is allowed to be. Accordingly, callback engine 600 may include a database system 608 in order to simplify the organization, analysis and handling of the large amount of data. In one embodiment, callback engine 600 also functions as a database server in addition to its role as a web server. However, with a large number of concurrent ankle monitor bracelet connections, to enhance scalability and performance it may be preferable to host database system 608 on a dedicated database server (not illustrated), as understood by routineers in the art.

Database system 608 may be implemented using a common database application suite. In one or more embodiments, database system 608 employs a relational database model, in which data is organized in the form of tables. The relational data model was introduced in 1970 by E. F. Codd of International Business Machines IBM, and it has continued to evolve. Relational databases are organized around a mathematical theory that aims to maximize flexibility. The relational data model consists of three components: A data structure wherein data are organized in the form of tables; means of data manipulation for manipulating data stored in the tables, e.g. structured query language (SQL); and means for ensuring data integrity in conformance with business rules. Many relational database management systems (RDBMS) exist, such as Oracle® MySQL and DB® from IBM. Relational database systems offer scalability and architectural flexibility to provide robust database solutions that perform, adapt and respond to today's business initiatives. Most modern database software is full-featured, robust, scalable and easy to use.

Database system 608 may also be implemented using a non-relational methodology, including flat files and legacy database applications, such as IBM's IMS or Computer Associates' IDMS. IMS is a hierarchical database, and IDMS uses the network database model. Unlike relational databases which are designed for flexibility, IMS and IDMS put a premium on performance over flexibility. For example, IMS's hierarchical approach puts every item of data in an inverted-tree structure, extending downward in a series of parent-child relationships. This approach provides a high-performance path to a given datum. The IDMS network database model allows for more complex, overlapping hierarchies, but falls short of the flexibility of a true relational database system. As database design and programming is well known to routineers in the art, further detail of database system 608 is omitted for the sake of brevity.

Tracking system 500 may include a network firewall to protect it from unauthorized intrusion and computer hacking efforts. The firewall may be a firewall software application executed by callback engine 600, or it may be a discrete and independent hardware firewall operatively coupled between the callback engine 600 and internet 504. Regardless of the type of firewall installed, the firewall provides controlled access to callback engine 600 using multiple recognized network security methods such as user and password challenges, VPN access, filtered IP address access, et cetera. In other words, callback engine 600 is secured to eliminate unauthorized access the same way that an ordinary computer is protected using existing or future common network security products. As network firewalls are well known in the art, further detailed discussion is omitted.

Communication between callback engine 600 and ankle monitor bracelets 10 may occur via three schemes. The first scheme employs direct mobile internet communications using a cellular system 502 that is coupled to the internet 504. Cellular system 502 is preferably a GSM system supporting GPRS, although other system types may be used, including CDMA, LTE, 4G, 5G, or types yet to be developed. For ankle monitor bracelet 10a of FIG. 19, GPRS or another suitable cellular data network is available, and ankle monitor bracelet 10a communicates directly with web server application 606 of callback engine 600 using a mobile data connection 506 over cellular system 502 and internet 504. For instance, ankle monitor bracelet 10a may send an HTML GET command to the defined URL and port of callback engine 600, as described above. The text string of the GET command contains the data of message 400 (FIG. 17), e.g., SIM-card unique identifier, location of ankle monitor bracelet 10a, current timestamp, battery level, state of bracelet/screw cap/magnet protection. Callback engine 600 may send a command message to ankle monitor bracelet 10a in a similar manner, as understood by those skilled in the art.

The second scheme employs communication direct wireless internet communications using via a Wi-Fi hotspot or access point 520 that is coupled to internet 504. For ankle monitor bracelet 10b of FIG. 19, a Wi-Fi data network is available, and ankle monitor bracelet 10b communicates directly with web server application 606 of callback engine 600 using an IEEE 802.11 data connection 522 to internet 504. For instance, ankle monitor bracelet 10a may send an HTML form command to the defined URL and port of callback engine 600, as described above. Callback engine 600 may send a command message to ankle monitor bracelet 10b in a similar manner, as understood by those skilled in the art.

The third scheme employs communication using SMS text messaging. Due to its present location and circumstances, ankle monitor bracelet 10c has no suitable data network available to it. It may communicate with callback engine 600 using SMS text message. As shown, ankle monitor bracelet 10c may send a text message 508 containing the data of message 400 to relay station 602 using cellular system 502. Relay station 602 in turn reformats the data, e.g., as a HTML POST command, and transmits it over internet 504 to webserver application 606 of callback engine 600. One suitable relay service provider is Twilio, which performs a myriad of wireless and internet services. Twilio provide a cellular service in which a special short phone number validates SMS only from devices having Twilio subscriber identity module (SIM) cards.

However, in other embodiments, the third communication scheme may employ communication using direct SMS text messaging 510 between ankle monitor bracelet 10c and callback engine 600. In this embodiment, callback engine 600 is equipped with one or more GSM modems or the like and supporting modem software utilities to directly handle incoming and outgoing text communications. The number of modems will largely depend on the number of ankle monitor bracelets 10 that callback engine 600 must track and the availability of mobile internet services in the geographical regions in which the ankle monitor bracelets 10 are located.

Once a report message is received by webserver application 606 of callback engine 600, webserver application 606 invokes callback script 610 to process the received data. Processing steps of callback script 610 may be defined using any suitable computer language, including PHP, C++, Perl, shell scripts and the like, as known to routineers in the art. First, the incoming message are parsed and, if necessary, decrypted; the data is written to corresponding variables. Next, the variable DEVICE_ID is correlated with the defendant (wearer) identification and database record. All of the variables extracted from the incoming message are written to corresponding fields within database system 608.

If there are any restricted or allowed geographical zones defined for that particular ankle monitor bracelet 10, callback script 610 calculates if current LATITUDE and LONGITUDE is inside a restricted zone or outside an allowed zone. In case of a geographical violation, callback script 610 may generate and send a command message to ankle monitor bracelet 10, causing it to play a particular audio message that informs the wearer about the violation. Depending on the particular settings for that wearer, callback script 610 may also initiate an immediate notification to law enforcement authorities, by text, email, push notification, or other means, to notify them of the infraction.

If the battery voltage or charge level is below a predetermined threshold, callback script 610 may generate and send a command message to ankle monitor bracelet 10, causing it to play a particular audio message that informs the wearer to charge ankle monitor bracelet 10.

If any of STRAP_VIOLATION, CAP_VIOLATION, MAG_VIOLATION, or WRONG_PASSWD variables are equal to TRUE, callback script 610 may initiate an immediate notification to law enforcement authorities, by text, email, push notification, or other means, to notify them of the infraction.

Finally, callback script 610 checks the status of variable CMD_ACK, to determine whether a previous outgoing command to that particular ankle monitor bracelet 10 has been acknowledged. If not, callback engine 600 may generate and send a command message to that ankle monitor bracelet 10, repeating the previous outgoing command.

Callback engine 600 also maintains a queue of outgoing commands to be sent to particular ankle monitor bracelets 10. Outgoing commands may be requested by law enforcement authorities, for example, to change intervals between position and status reports, change the language for audio playback, send an audio message, set or update a Wi-Fi password, confirm a current location, or confirm that a wearer has acknowledged a violation or other audio message. Callback engine 600 attends to the queue at a frequent periodic basis according to the process defined by queue script 614. In one embodiment, a chronology table causes operating system 604 to execute queue script 614 at a specific interval of time. The Linux® operating system includes this feature using the CRON command and CRONTAB file. However, other methods to implement automatic triggering of queue script 614 may be used as known to routineers of the art.

Queue script 614 checks if there are any outgoing commands in the queue. In case of a command, queue script 614 generates and sends an outgoing command message to the particular ankle monitor bracelet 10, which includes a unique device password and command body. Processing steps of queue script 614 may be defined using any suitable computer language, including PHP, C++, Perl, shell scripts and the like, as known to routineers in the art.

Callback engine 600 may host a monitor administration application 612, although monitor administration application 612 may also be hosted on a separate web server (not illustrated) as understood by practitioners in the art. In one or more embodiments, monitor administration application 612 preferably includes a family of HTML and cascading style sheet (CSS) form files disposed in a web page directory accessed by web server application 606, and a series of Common Gateway Interface (CGI) shell scripts or compiled programs, disposed in a cgi-bin or like directory, that are selectively executed in order to transform otherwise static HTML form files into dynamic website interface 620 when displayed in a web browser running on remote computer device 622. Shell scripts or compiled programs of monitor administration application 612 may be defined using any suitable computer language, including PHP, C++, Perl, shell scripts and the like, as known to routineers in the art.

Monitor administration application 612 ideally employs standard windows-type display and control mechanisms including windows, client windows, frames, flexboxes, icons, buttons, check boxes, radio buttons, scroll bars, drop-down menus, pull-down menus, tabs, bar graphs, panes, panels, forms, slide bars, selection boxes, dialog boxes, text boxes, list boxes, menu bars, bar graphs, wizards, et cetera. The selection and layout of the user interface components, and the placement thereof, may vary widely within the scope of the present disclosure and may optionally be customized by each user. Ideally, monitor administration application 612 employs responsive site design techniques so as to automatically adjust layout and design to be readable and usable at any screen width. As user interface programming and design are well known in the art, further detail is omitted.

Web server application 606 and monitor administration application 612 cooperate to provide secure remote internet access to callback engine 600. Web server application 606 provides initial login access to remote computer device 622 via an initial or default HTML file that prompts the user for a username and password or other identifier; a law enforcement authority may enter login credentials and thereby obtain an instance of website interface 620 that is populated with that authority's custom data, i.e., the data associated with wearers under that authority's jurisdiction.

For each ankle monitor bracelet 10 under their jurisdiction, monitor administration application 612 allows law enforcement officials to: Post commands to callback engine's 600 outgoing command queue to change various settings of the device or play select audio messages, view location history, record and view the defendant's account, attach notes to the device's record, send SMS text massages to the defendant's mobile phone 630, review and confirm violations, set allowed and/or restricted geographic zones, review latest activity, such as check-in, contact with authorities, occasions of low battery charge, et cetera. The above list cites mere examples of capability provided by monitor administration application 612; other functions may be implemented as known to routineers in the art. Further, should an official be logged in to website interface 620, monitor administration application 612 may display a pop-up window to immediately inform the official should any violation occur.

Monitor administration application 612 may generate and make available a myriad of reports from the collected data, allowing a user to query and format activity data and graphically display trends with tremendous flexibility. For example, a visual history of location and movements of an ankle monitor bracelet 10 may be graphically displayed, overlaid onto a map image. Monitor administration application 612 may also provide downloadable reports compatible with off-the-shelf software products such as Excel® Word® Access® et cetera.

Tracking system 500 may also include a mobile phone application 632 by which callback server 600 can contact a wearer. Mobile phone application 632 may support Android® and Apple® iOS® platforms and enable persistent multichannel connection between the wearer and law enforcement authorities; mobile phone application 632 may provide SMS messages, telephone calls and push notifications, for example. Mobile phone application 632 may also provide contacts list with service phone numbers, a visual map display of allowed and restricted zones, and other information useful to the wearer. As mobile phone application development is well known in the art, further detail is omitted.

Terms of orientation, such as top, bottom, front, back, left, and right, are used herein to aid the reader in understanding the disclosure. These terms are not intended to be limiting, and the described orientation of ankle monitor bracelet 10 may be changed without limiting the scope of the disclosure.

The Abstract of the disclosure is solely for providing the a way by which to determine quickly from a cursory reading the nature and gist of technical disclosure, and it represents solely one or more embodiments.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A tracking and monitoring system comprising:
a callback engine including a server computer hosting a database system and operable to execute a webserver application, a callback script, and a queue script, said webserver application operable to receive an inbound communication to the callback engine and to selectively call said callback script to process the inbound communication; and
an ankle monitor bracelet including a global navigation satellite system module operable to determine a geographical location of the ankle monitor bracelet and a mobile communications module operable to send a status message having coordinates defining the location to the callback engine; wherein
said database system is operable to store data associated with the ankle monitor bracelet defining one or more of a group consisting of an allowed zone, a restricted zone, and a defendant identification, and
said callback script is operable to process the status message to record the coordinates in the database system, to calculate if the location falls outside the allowed zone, to calculate if the location falls inside the restricted zone, and to notify an authority if a geographical violation has occurred wherein:
said ankle monitor bracelet further includes a non-volatile memory, an audio module having a plurality of pre-recorded audio messages, and a speaker;
said ankle monitor bracelet is operable to store a device password and a plurality of settings that determine operation of the ankle monitor bracelet in the non-volatile memory;
said queue script is operable to cause the callback engine to send a command message to the ankle monitor bracelet, the command message including a password and a command;
said ankle monitor bracelet is operable to receive the command message and authenticate the command message by comparing the password included in the command message with the device password;
said ankle monitor bracelet is operable to execute the command by at least one of a group consisting of updating at least one of the plurality of settings in the non-volatile memory and audibly playing by the audio module and the speaker at least one of the pre-recorded audio messages;
said ankle monitor bracelet is operable to send a confirmation of the execution of the command to the callback engine; and
said callback script is operable to process and store in the database system the confirmation.

2. The tracking and monitoring system of claim 1 wherein:
said ankle monitor bracelet is operable to selectively send said status message to said callback engine by sending a first hypertext markup language form command over a cellular data internet connection; and
said ankle monitor bracelet is operable to selectively send said status message to said callback engine by sending a short message service text message over a cellular system connection.

3. The tracking and monitoring system of claim 2 further comprising:
a relay station operable receive the short message service text message from the ankle monitor bracelet and forward the status message to the callback engine by sending a second hypertext markup language form command over an internet connection.

4. The tracking and monitoring system of claim 2 wherein said ankle monitor bracelet further comprises:

a Wi-Fi module operable to selectively send the status message to the callback engine by sending the first hypertext markup language form command over a Wi-Fi internet connection.

5. The tracking and monitoring system of claim 1 wherein:
said ankle monitor bracelet further includes a battery and an intelligent charge controller;
said ankle monitor bracelet is operable to include in the status message a battery voltage indication and a battery charge indication; and
said callback script is operable to process the status message to record the battery voltage indication and the battery charge indication in the database system.

6. The tracking and monitoring system of claim 1 wherein:
said ankle monitor bracelet further includes a strap defining a first electrical circuit;
said ankle monitor bracelet is operable to determine a strap state by measuring a parameter of the first electrical circuit, the strap state being one from a group consisting of open, closed, cut, and shorted;
said ankle monitor bracelet further includes a screw cap forming a switch within a second electrical circuit;
said ankle monitor bracelet is operable to determine an absence of the screw cap by measuring a parameter of the second electrical circuit;
said ankle monitor bracelet further includes a reed switch within a third electrical circuit;
said ankle monitor bracelet is operable to determine an external magnetic influence by measuring a parameter of the third electrical circuit;
said ankle monitor bracelet is operable to determine a security violation by one or more of a group consisting of the open strap state, the cut strap state, the shorted strap state, the absence if the screw cap, and the external magnetic influence;
said ankle monitor bracelet is operable to include in the status message an indication of the security violation; and
said callback script is operable to process the status message to record the security violation in the database system and to notify the authority of the security violation.

7. An ankle monitor bracelet comprising:
a microcontroller having a non-volatile memory and operable to generate a message;
a global navigation satellite system module coupled to the microcontroller and operable to determine a geographical location of the ankle monitor bracelet;
a strap defining a first electrical circuit coupled to the microcontroller, the microcontroller operable to measure a parameter of the first electrical circuit and thereby determine a strap state as one of a group consisting of open, closed, cut, and shorted; and
a mobile communications module coupled to the microcontroller, the microcontroller operable to query the mobile communications module to determine availabilities of a cellular data internet connection and a short message service cellular system connection and to selectively cause the mobile communications module to send the status message over one of a group consisting of the cellular data internet connection and the short message service cellular system connection; wherein
the status message includes coordinates defining the location and an indication of the strap state.

8. The ankle monitor bracelet of claim 7 further comprising:
a Wi-Fi module coupled to the microcontroller, the microcontroller operable to query the Wi-Fi module to determine availability of a Wi-Fi internet connection and to selectively cause the Wi-Fi module to send the status message over the Wi-Fi internet connection.

9. The ankle monitor bracelet of claim 7 further comprising:
a visual display coupled to the microcontroller and operable to visually indicate an ankle monitor bracelet status.

10. The ankle monitor bracelet of claim 7 further comprising:
an audio module coupled to the microcontroller, the audio module including a plurality of pre-recorded audio messages, the microcontroller operable to selectively cause the audio module to play one of the plurality of pre-recorded audio messages;
a speaker coupled to the audio module for producing audible sounds, wherein
the status message includes an indication of the one of the plurality of pre-recorded audio messages played.

11. The ankle monitor bracelet of claim 7 further comprising:
a battery coupled to the microcontroller, and a battery protection module coupled to the battery, the microcontroller operable to determine a battery voltage level;
an intelligent charge controller coupled to the microcontroller, the microcontroller operable to query the intelligent charge controller to determine a battery charge level; and
an accelerometer coupled to the microcontroller, the microcontroller operable to query the accelerometer and determine a period of inactivity of motion and selectively place the global navigation satellite system module in a low-power state; wherein
the status message includes a battery voltage indication and a battery charge indication.

12. The ankle monitor bracelet of claim 7 further comprising:
a screw cap forming a switch within a second electrical circuit, the microcontroller coupled to the second electrical circuit and operable to determine an absence of the screw cap by measuring a parameter of the second electrical circuit; and
a reed switch within a third electrical circuit, the microcontroller coupled to the third electrical circuit and operable to determine a presence of an external magnetic influence by measuring a parameter of the third electrical circuit; wherein
the status message includes an indication of the absence of the screw cap and the presence of the external magnetic influence.

13. The ankle monitor bracelet of claim 7 further comprising:
a magnetic bridge coupled to a universal serial bus of the microcontroller.

14. A tracking and monitoring method comprising:
steps periodically performed by a microcontroller of an ankle monitor bracelet and repeated at a first frequency, including
querying an accelerometer of the ankle monitor bracelet to determine if within a period of ankle monitor bracelet inactivity, selectively querying a global navigation satellite system module of the ankle monitor bracelet to determine a location of the ankle monitor bracelet, determining a battery voltage level of a battery of the ankle monitor bracelet, and querying an intelligent charge controller of the ankle monitor bracelet to determine a battery charge level;

steps periodically performed by the microcontroller and repeated at a second frequency, including measuring an electrical parameter of a strap of the ankle monitor bracelet to determine a strap state, measuring the electrical continuity of a circuit to determine an absence of a screw cap of the ankle monitor bracelet, and detecting actuation of a reed switch of the ankle monitor bracelet to determine a presence of an external magnetic influence; and steps periodically performed by the microcontroller and repeated at a third frequency, including querying a at least one of a group consisting of a mobile communications module of the ankle monitor bracelet and a Wi-Fi module of the ankle monitor bracelet to determine availabilities of a data internet connection and a short message service cellular system connection, generating a status message including coordinates defining the location of the ankle monitor bracelet, a timestamp, the strap state, the battery voltage level, the battery charge level, an indication of the absence of the screw cap, and an indication of the presence of the external magnetic influence, and selectively sending the status message to a callback server via one of a group consisting of the data internet connection and the short message service cellular system connection.

15. The tracking and monitoring method of claim 14 further comprising the steps performed by the callback server of:

receiving said status message from the ankle monitor bracelet;

parsing said status message from the ankle monitor bracelet;

correlating the status message with a defendant identification;

recording the coordinates and the timestamp in a database system of the callback server;

recording the battery voltage level and the battery charge level in the database system;

recording the strap state, the indication of the absence of the screw cap, and the indication of the presence of the external magnetic influence in the database system;

calculating if the location of the ankle monitor bracelet falls outside an allowed zone;

calculating if the location of the ankle monitor bracelet falls inside a restricted zone; and selectively notifying an authority if a geographical or security violation has occurred.

16. The tracking and monitoring method of claim 14 further comprising the steps of:

sending by the callback server a command message having a password and a command to the ankle monitor bracelet;

receiving by the microcontroller of the ankle monitor bracelet the command message;

parsing by the microcontroller the command message;

authenticating by the microcontroller the command message by comparing the password of the command message with a device password stored in non-volatile memory of the microcontroller;

executing by the microcontroller the command of the command message;

sending by the ankle monitor bracelet to the callback server a command acknowledgement via one of the group consisting of the data internet connection and the short message service cellular system connection; and receiving by the callback server the command acknowledgement.

17. The tracking and monitoring method of claim 14 wherein:

the step of executing by the microcontroller the command comprises a step from a group consisting of updating a setting stored in the non-volatile memory of the microcontroller, and playing by an audio module of the ankle monitor bracelet one of a plurality of prerecorded audio messages.

18. The tracking and monitoring method of claim 14 wherein:

the first frequency falls within a range between one cycle per minute and one cycle per 0.5 seconds;

the second frequency falls within a range between one cycle per 500 milliseconds and one cycle per millisecond; and the third frequency falls within a range between one cycle per 0.5 hours and one cycle per minute.

19. The tracking and monitoring method of claim 14 further comprising the steps of:

receiving by a relay station the status message from the ankle monitor bracelet via the short message service cellular system connection; and forwarding the status message by the relay station to the callback server via an internet connection.

20. A tracking and monitoring system comprising:

a callback engine including a server computer hosting a database system and operable to execute a webserver application, a callback script, and a queue script, said webserver application operable to receive an inbound communication to the callback engine and to selectively call said callback script to process the inbound communication; and an ankle monitor bracelet including a global navigation satellite system module operable to determine a geographical location of the ankle monitor bracelet and a mobile communications module operable to send a status message having coordinates defining the location to the callback engine; wherein said database system is operable to store data associated with the ankle monitor bracelet defining one or more of a group consisting of an allowed zone, a restricted zone, and a defendant identification, and said callback script is operable to process the status message to record the coordinates in the database system, to calculate if the location falls outside the allowed zone, to calculate if the location falls inside the restricted zone, and to notify an authority if a geographical violation has occurred wherein:

said ankle monitor bracelet further includes a strap defining a first electrical circuit;

said ankle monitor bracelet is operable to determine a strap state by measuring a parameter of the first electrical circuit, the strap state being one from a group consisting of open, closed, cut, and shorted;

said ankle monitor bracelet further includes a screw cap forming a switch within a second electrical circuit;

said ankle monitor bracelet is operable to determine an absence of the screw cap by measuring a parameter of the second electrical circuit;

said ankle monitor bracelet further includes a reed switch within a third electrical circuit;

said ankle monitor bracelet is operable to determine an external magnetic influence by measuring a parameter of the third electrical circuit;

said ankle monitor bracelet is operable to determine a security violation by one or more of a group consisting of the open strap state, the cut strap state, the shorted strap state, the absence if the screw cap, and the external magnetic influence;

said ankle monitor bracelet is operable to include in the status message an indication of the security violation; and said callback script is operable to process the status message to record the security violation in the database system and to notify the authority of the security violation.

21. The tracking and monitoring system of claim 20 wherein:

said ankle monitor bracelet is operable to selectively send said status message to said callback engine by sending a first hypertext markup language form command over a cellular data internet connection; and said ankle monitor bracelet is operable to selectively send said status message to said callback engine by sending a short message service text message over a cellular system connection.

22. The tracking and monitoring system of claim 21 further comprising:

a relay station operable receive the short message service text message from the ankle monitor bracelet and forward the status message to the callback engine by sending a second hypertext markup language form command over an internet connection.

23. The tracking and monitoring system of claim 21 wherein said ankle monitor bracelet further comprises:

a Wi-Fi module operable to selectively send the status message to the callback engine by sending the first hypertext markup language form command over a Wi-Fi internet connection.

24. The tracking and monitoring system of claim 20 wherein:

said ankle monitor bracelet further includes a battery and an intelligent charge controller;

said ankle monitor bracelet is operable to include in the status message a battery voltage indication and a battery charge indication; and said callback script is operable to process the status message to record the battery voltage indication and the battery charge indication in the database system.

* * * * *